United States Patent
Kwon et al.

(10) Patent No.: US 9,071,983 B2
(45) Date of Patent: Jun. 30, 2015

(54) COMMUNICATION SYSTEM WITH REPEAT-RESPONSE PROCESSING MECHANISM AND METHOD OF OPERATION THEREOF

(71) Applicant: Samsung Electronics Co., Ltd., Gyeonggi-Do (KR)

(72) Inventors: Hyukjoon Kwon, San Diego, CA (US); Jungwon Lee, San Diego, CA (US); Inyup Kang, San Diego, CA (US)

(73) Assignee: Samsung Electronics Co., Ltd., Gyeonggi-Do (SK)

( * ) Notice: Subject to any disclaimer, the term of this patent is extended or adjusted under 35 U.S.C. 154(b) by 233 days.

(21) Appl. No.: 13/890,758

(22) Filed: May 9, 2013

(65) Prior Publication Data

US 2014/0066114 A1  Mar. 6, 2014

Related U.S. Application Data

(60) Provisional application No. 61/694,067, filed on Aug. 28, 2012.

(51) Int. Cl.
*H04W 24/02* (2009.01)

(52) U.S. Cl.
CPC ..................... *H04W 24/02* (2013.01)

(58) Field of Classification Search
CPC ..... H04W 24/02; H04W 24/04; H04W 24/06; H04W 24/08; H04W 24/10; H04W 64/00; H04W 68/00; H04W 68/005; H04W 68/06; H04W 68/12; H04W 72/00; H04W 74/00; H04W 76/00
USPC ........ 455/501, 450, 423, 67.16, 67.13, 115.1, 455/135, 222, 226.3, 224, 67.3, 63; 375/340, 350, 346; 370/338, 330, 335, 370/329, 328

See application file for complete search history.

(56) References Cited

U.S. PATENT DOCUMENTS 8,027,402 B2    9/2011  Lee et al.
2004/0229625 A1* 11/2004  Laroia et al. ................. 455/450
(Continued)

FOREIGN PATENT DOCUMENTS

WO    2011-087227 A2    7/2011

OTHER PUBLICATIONS

Kwon, H. et al. "Combining Schemes for Hybrid ARQ with Interference-Aware Successive Decoding", Submission to IEEE Transactions on Wireless Communications, pp. 1-9.
(Continued)

*Primary Examiner* — Tan Trinh
(74) *Attorney, Agent, or Firm* — IP Investment Law Group

(57) ABSTRACT

A communication system includes: a signal identification module configured to receive a repeat response for receiving the repeat response associated with a receiver signal; a signal analysis module, coupled to the signal identification module, configured to determine a serving data, a serving channel estimate, an interference channel estimate, or a combination thereof an interference data from the repeat response with an interference-aware processing mechanism; a combining module, coupled to the signal analysis module, configured to combine the repeat response and the receiver signal based on the serving data, the serving channel estimate, the interference channel estimate, the interference data, or a combination thereof; and a decoding module, coupled to the combining module, configured to generate a replication data based on combining the repeat response and the receiver signal based on the serving data, the serving channel estimate, the interference channel estimate, the interference data, or a combination thereof for communicating with a device.

20 Claims, 5 Drawing Sheets

(56) References Cited

U.S. PATENT DOCUMENTS

| | | |
|---|---|---|
| 2007/0036179 A1 | 2/2007 | Palanki et al. |
| 2007/0049199 A1 | 3/2007 | Lim et al. |
| 2007/0104164 A1* | 5/2007 | Laroia et al. .................. 370/338 |
| 2007/0140168 A1* | 6/2007 | Laroia et al. .................. 370/330 |
| 2007/0149242 A1 | 6/2007 | Kim et al. |
| 2008/0025429 A1 | 1/2008 | Lee et al. |
| 2008/0025443 A1 | 1/2008 | Lee et al. |
| 2008/0037670 A1 | 2/2008 | Lee et al. |
| 2008/0063103 A1 | 3/2008 | Lee et al. |
| 2008/0069039 A1* | 3/2008 | Li et al. ......................... 370/329 |
| 2008/0198941 A1 | 8/2008 | Song et al. |
| 2010/0002816 A1* | 1/2010 | Mody et al. ................... 375/350 |
| 2011/0051860 A1 | 3/2011 | Tang et al. |
| 2011/0267937 A1 | 11/2011 | Yoo et al. |
| 2013/0336430 A1* | 12/2013 | Au Yeung et al. ............ 375/340 |
| 2013/0343271 A1* | 12/2013 | El-Khamy et al. ............ 370/328 |
| 2014/0105127 A1* | 4/2014 | Zhuang et al. ................ 370/329 |
| 2014/0119483 A1* | 5/2014 | Wu et al. ....................... 375/346 |
| 2014/0362954 A1* | 12/2014 | Choi et al. ..................... 375/341 |
| 2014/0362958 A1* | 12/2014 | Choi et al. ..................... 375/348 |
| 2014/0369446 A1* | 12/2014 | Kwon et al. ................... 375/340 |

OTHER PUBLICATIONS

Jang, E. et al., "On the Combining Schemes for MIMO Systems with Hybrid ARQ", IEEE Transactions on Wireless Communications, Feb. 2009, pp. 836-842, vol. 8, No. 2.

* cited by examiner

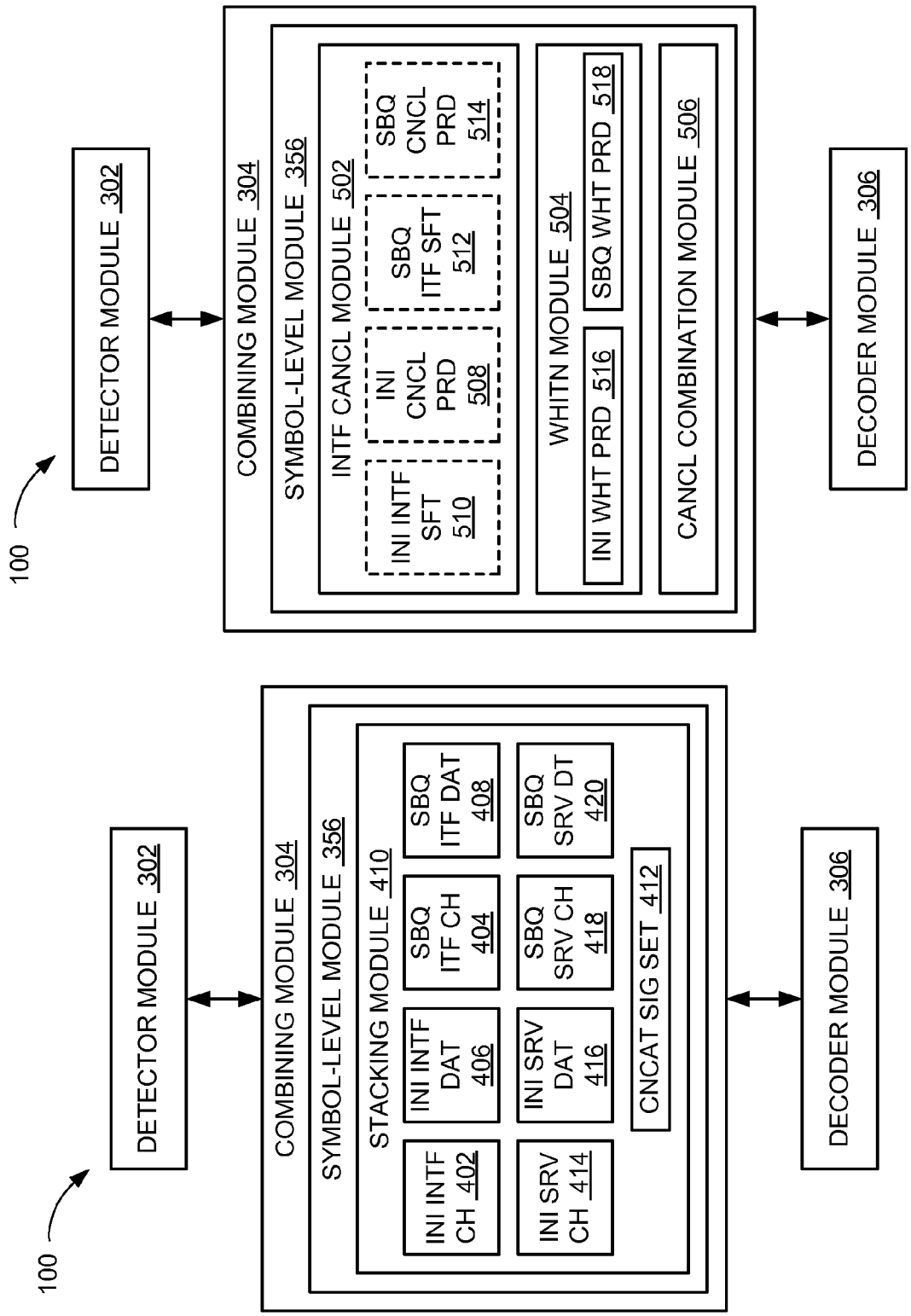

COMMUNICATION SYSTEM WITH REPEAT-RESPONSE PROCESSING MECHANISM AND METHOD OF OPERATION THEREOF

CROSS-REFERENCE TO RELATED APPLICATION(S)

This application claims the benefit of U.S. Provisional Patent Application Ser. No. 61/694,067 filed Aug. 28, 2012, and the subject matter thereof is incorporated herein by reference thereto.

TECHNICAL FIELD

An embodiment of the present invention relates generally to a communication system, and more particularly to a system with repeat-response processing mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a communication system with repeat-response processing mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system, including: a signal identification module configured to receive a repeat response for receiving the repeat response associated with a receiver signal; a signal analysis module, coupled to the signal identification module, configured to determine a serving data, a serving channel estimate, an interference channel estimate, or a combination thereof an interference data from the repeat response with an interference-aware processing mechanism; a combining module, coupled to the signal analysis module, configured to combine the repeat response and the receiver signal based on the serving data, the serving channel estimate, the interference channel estimate, the interference data, or a combination thereof; and a decoding module, coupled to the combining module, configured to generate a replication data based on combining the repeat response and the receiver signal based on the serving data, the serving channel estimate, the interference channel estimate, the interference data, or a combination thereof for communicating with a device.

An embodiment of the present invention provides a method of operation of a communication system including: receiving a repeat response for receiving the repeat response associated with a receiver signal; determining a serving data, a serving channel estimate, an interference channel estimate, or a combination thereof an interference data from the repeat response with an interference-aware processing mechanism; combining the repeat response and the receiver signal based on the serving data, the serving channel estimate, the interference channel estimate, the interference data, or a combination thereof; and generating a replication data based on combining the repeat response and the receiver signal based on the serving data, the serving channel estimate, the interference channel estimate, the interference data, or a combination thereof for communicating with a device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 4 is a further control flow of the communication system.

FIG. 5 is a further control flow of the communication system.

DETAILED DESCRIPTION

Figure 1:
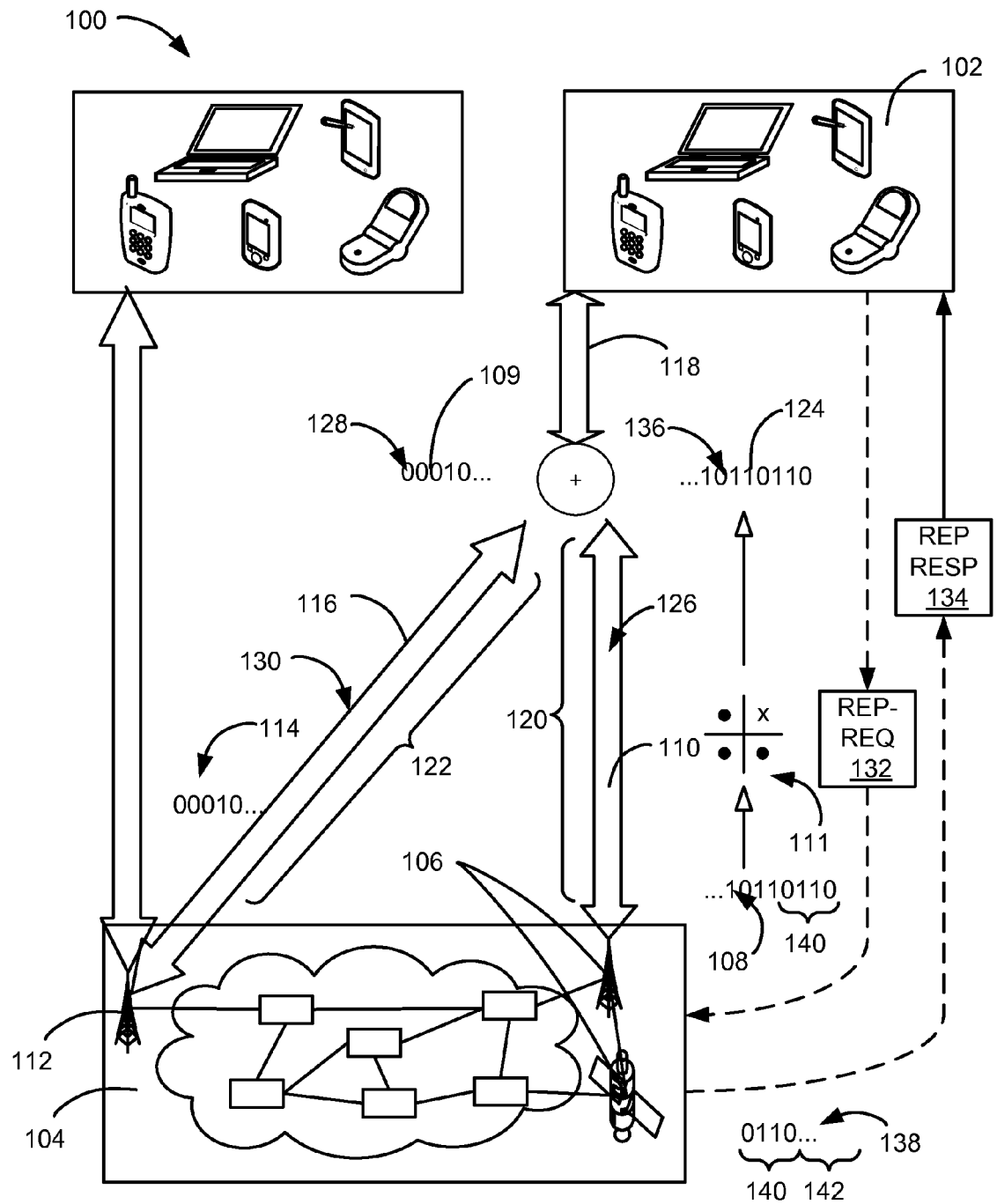
FIG. 1 is a communication system with repeat-response processing based adjustment mechanism in an embodiment of the present invention.

The following embodiments of the present invention can be used to combine a repeat response and a receiver signal, with the repeat response corresponding to a repeat request based on processing the receiver signal. The repeat response and the receiver signal can be combined while utilizing information regarding an interference portion included therein according to an interference-aware processing mechanism.

The repeat response and the receiver signal can be combined at a symbol-level information, a bit-level information, or a combination thereof. The combination process can utilize an initial extrinsic value, a subsequent extrinsic value, an initial-interference-channel, an initial-interference-data, a subsequent-interference-channel, a subsequent-interference-data, an initial-interference soft-estimate, an initial-cancellation-product, an initial-whitening-product, a subsequent-interference soft-estimate, a subsequent-cancellation-product, a subsequent-whitening-product, or a combination thereof derived from the repeat response and the receiver signal.

A concatenation signal set including the serving data, the serving channel estimate, the interference data, and the interference channel estimate, the initial-whitening-product, and the subsequent-whitening-product increase efficiency by allowing for signals to be combined at the symbol-level information. Further, the concatenation signal set including the serving data, the serving channel estimate, the interference data, and the interference channel estimate, the initial-whitening-product, and the subsequent-whitening-product for all relevant transmissions processed with the interference-aware processing mechanism provides accurate and speedy reproduction of the replication data.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a communication system 100 with rep eat-response processing based adjustment mechanism in an embodiment of the present invention. The communication system 100 includes a mobile device 102, such as a cellular phone or a notebook computer, connected to a network 104. The network 104 is a system of wired or wireless communication devices that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can include a base station 106 for directly linking and communicating with the mobile device 102. The base station 106 can receive wireless signals from the mobile device 102, transmit signals to the mobile device 102, process signals, or a combination thereof. The base station 106 can also relay signals between other base stations, components within the network 104, or a combination thereof.

The mobile device 102 can be connected to the network 104 through the base station 106. For example, the base station 106 can include or be with a cell tower, a wireless router, an antenna, a processing device, or a combination thereof being used to send signals to or receive signals from the mobile device 102, such as a smart phone or a laptop computer.

The mobile device 102 can connect to and communicate with other devices, such as other mobile devices, servers, computers, telephones, or a combination thereof. The mobile device 102 can communicate with other devices by transmitting signals, receiving signals, processing signals, or a combination thereof and displaying a content of the signals, audibly recreating sounds according to the content of the signals, processing according to the content, such as storing an application or updating an operating system.

The base station 106 can be used to wirelessly exchange signals for communication, including voice signals of a telephone call or data representing a webpage and interactions therewith. The base station 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The base station 106 can transmit a transmitter signal 108 for communicating with the mobile station 102. The transmitter signal 108 is data intended to communicate by reproduction or processing at a receiving device. The transmitter signal 108 can be bit-level information 109 or a sequence of bits modified according to communication format. For example, the transmitter signal 108 can be a sequence of informational bits, processing related bits, such as error correction information or formatting information, or a combination thereof transformed into corresponding symbol-level information 111 according to a modulation scheme, such as quadrature amplitude modulation (QAM) or phase-shift keying (PSK).

The transmitter signal 108 can arrive at the mobile station 102 after traversing a transmitter channel 110. The transmitter channel 110 can be wireless, wired, or a combination thereof. The transmitter channel 110 can be a direct link between the mobile device 102 and the base station 106 or can include repeaters, amplifiers, or a combination thereof. For example, the transmitter channel 110 can include communication frequency, time slot, packet designation, transmission rate, channel code, or a combination thereof used for transmitting signals between the mobile device 102 and the base station 106.

The mobile station 102 can receive signals from other unintended sources. The mobile station 102 can receive an interference signal 114 from an interference source 112. The interference signal 114 is data unintended for communication at the receiving device. The interference source 112 can be any source generating signals unintended for a specific receiver.

For example, the transmitter signal 108 intended for the mobile station 102 can be the interference signal 114 to a different device and the base station 106 can be seen as the interference source 112 to the different device. Also for example, the interference signal 114 can include signals intended for communication with devices other than the mobile station 102 or to the mobile station 102 for a currently unrelated purpose or for a function currently not accessed on the mobile station 102.

As a more specific example, the interference source 112 can include various transmitters, including a base station or a satellite dish, another mobile communication device, such as a smart phone or a laptop computer, broadcasting station, such as for television or radio, or a combination thereof. Also for example, the interference signal 114 can include wireless signals carrying voice information associated with a phone call intended for phones other than the mobile station 102 or broadcasted television signals when the mobile station 102 is not accessing the television viewing feature.

The interference signal 114 can traverse an interference channel 116 to arrive at the mobile station 102. The interference channel 116 can be similar to the transmitter channel 110 but for the differences in characteristics due to location difference between the base station 106 and the interference source 112, due to difference in method of communication or resources used between the transmitter signal 108 and the interference signal 114, or a combination thereof.

For example, the interference channel 116 can be wireless, wired, or a combination thereof. The interference channel 116 can be an unintended direct link between the mobile device 102 and the interference source 112 or can include repeaters, amplifiers, or a combination thereof. Also for example, the interference channel 116 can include communication frequency, time slot, packet designation, transmission rate, channel code, or a combination thereof used for transmitting signals between the interference source and the different device, and further accessible by the mobile device 102.

The mobile station 102 can receive a receiver signal 118. The receiver signal 118 is information received by a device in the communication system 100. The receiver signal 118 can include the transmitter signal 108 that has been altered from traversing the transmitter channel 110. The receiver signal 118 can further include the interference signal 114 that has been altered from traversing the interference channel 116.

The receiver signal 118 can include a serving portion 120 and an interference portion 122. The communication system 100 can determine the serving portion 120 and the interference portion 122 from the receiver signal 118.

The serving portion 120 is a portion of the receiver signal 118 corresponding to the transmitter signal 108. The interference portion 122 is a portion of the receiver signal 118 corresponding to the interference signal 114. The communication system 100 can further determine serving data 124 and a serving channel estimate 126 corresponding to the serving portion 120 and determine interference data 128 and an interference channel estimate 130 corresponding to the interference portion 122.

The serving data 124 is information originally intended for communication with the mobile station 102. The serving data 124 can be one or more symbol vectors or a sequence of bits corresponding to the transmitter signal 108. The serving data 124 can be the intended content within the transmitter signal 108 before or after processing for communication. The serving data 124 can be the symbol-level information 111 or the bit-level information 109 intended for reproduction or use at the mobile device 102.

The serving channel estimate 126 is a description of changes to signals caused by the transmitter channel 110. The serving channel estimate 126 can describe and quantize reflection, loss, delay, refraction, obstructions, or a combination thereof a signal can experience while traversing between the base station 106 and the mobile device 102. The serving channel estimate 126 can be a matrix value characterizing the transmitter channel 110.

The interference data 128 is information originally unintended for communication with the mobile station 102. The interference data 128 can be one or more symbol vectors or a sequence of bits corresponding to the interference signal 114. The interference data 128 can be the intended content within the interference signal 114 before or after processing for communication. The interference data 128 can be the symbol-level information 111 or the bit-level information 109 intended for reproduction or use at a device other than the mobile device 102 or for a feature or application currently not used or accessed by the mobile device 102.

The interference channel estimate 130 is a description of changes to signals caused by the interference channel 116. The interference channel estimate 130 can describe and quantize reflection, loss, delay, refraction, obstructions, or a combination thereof a signal can experience while traversing between the interference source 112 and the mobile device 102. The interference channel estimate 130 can be a matrix value characterizing the interference channel 116.

The communication between the base station 106 and the mobile device 102 for the communication system 100 can be represented as:

$$y_i = H_{D,i} x_D + H_{I,i} x_{I,i} + n_i. \qquad \text{Equation (1)}.$$

The receiver signal 118 can be represented by y. The serving channel estimate 126 can be represented by $H_{D,i}$ and the serving data 124 can be represented by $x_D$. The interference channel estimate 130 can be represented by $H_{I,i}$, and the interference data 128 can be represented by $x_{I,i}$. Noise detected by the communication system 100 can be represented as $n_i$.

The mobile station 102 can transmit a repeat request 132 based on processing the receiver signal 118. The base station 106 can transmit a different instance of the transmitter signal 108 based on the repeat request 132.

The mobile station 102 can receive a repeat response 134 corresponding to the different instance of transmitter signal 108 transmitted by the base station 106. The repeat response 134 can be an instance of the receiver signal 118 corresponding to a retransmission according to the repeat request 132.

The repeat response 134 can be the different instance of the transmitter signal 108 retransmitted by the base station 106 in response to the repeat request 132. The repeat response 134 can have content or intended data, such as for the serving data 124, identical to the first instance of the transmitter signal 108 or a portion therein. The repeat response 134 can have identical or different header portion, format portion, error processing scheme, modulation and coding scheme (MCS) in comparison to the receiver signal 118, The serving data 124 or a portion therein can remain constant between an initial instance of the receiver signal 118 and the repeat response 134 when being transmitted from the base station 106. The serving channel estimate 126, the interference data 128, the interference channel estimate 130 can change between the first instance of the receiver signal 118 and the repeat response 134.

Since the repeat request 132 can be due to error in processing an initial data 136, the initial data 136 and a repeat data 138 can be different during processing. The initial data 136 is a result of processing for the serving data 124 from the initial instance of the receiver signal 118 and the repeat data 138 is a result of processing for the serving data 124 from the repeat response 134. The initial data 136 and the repeat data 138 can be processed at the bit-level information 109 or at the symbol-level information 111.

The repeat request 132 and the repeat response 134 can follow a hybrid automatic-repeat-request (HARM) scheme. The repeat request 132 can be a negative-acknowledgement (NACK) corresponding to unsuccessful detecting or decoding of the receiver signal 118. The repeat response 134 can be according to chase combining scheme using the same MCS between transmitting for the receiver signal 118 and the repeat response 134. The repeat response 134 can be according to incremental redundancy scheme that uses different MCS between the two transmissions.

The communication system 100 can have an overlap region 140 and a non-overlapping region 142 between the transmitter signal 108 for the initial transmission and the repeat response 134. The overlap region 140 is information common or repeated between the transmitter signal 108 for the initial transmission and the repeat response 134. The non-overlapping region 142 is information not repeated between the transmitter signal 108 for the initial transmission and the repeat response 134.

For example, the overlap region 140 can include common or repeated information between the receiver signal 118 and the repeat response 134. As a more specific example, the overlap region 140 can include all of the intended content in the receiver signal 118 and the repeat response 134. As a further specific example, the overlap region 140 can include a portion of the intended content in receiver signal 118 and the repeat response 134. The non-overlapping region 142 can include a further portion exclusive of the overlap region 140 in the initial data 136, the repeat data 138, or a combination thereof.

For illustrative purposes the overlap region 140 and the non-overlapping region 142 will be described as being based on overlapping instances of symbols between the initial transmission and the repeat response 134. However, it is understood that the overlap region 140 and the non-overlapping region 142 can be based on overlapping other than that of the symbol-level information 111. For example, the overlap region 140 and the non-overlapping region can overlap based on the bit-level information 109 or a combination of the bit-level information 109 and the symbol-level information 111.

The communication system 100 can determine the serving data 124, the serving channel estimate 126, the interference data 128, the interference channel estimate 130, or a combination thereof with respect to initially received instance of the receiver signal 118, the repeat response 134, or a combination thereof. The communication system 100 can further store, combine, or a combination of processes thereof for the initial data 136 and the repeat data 138. Details regarding processing of the receiver signal 118 will be described below.

Figure 2:
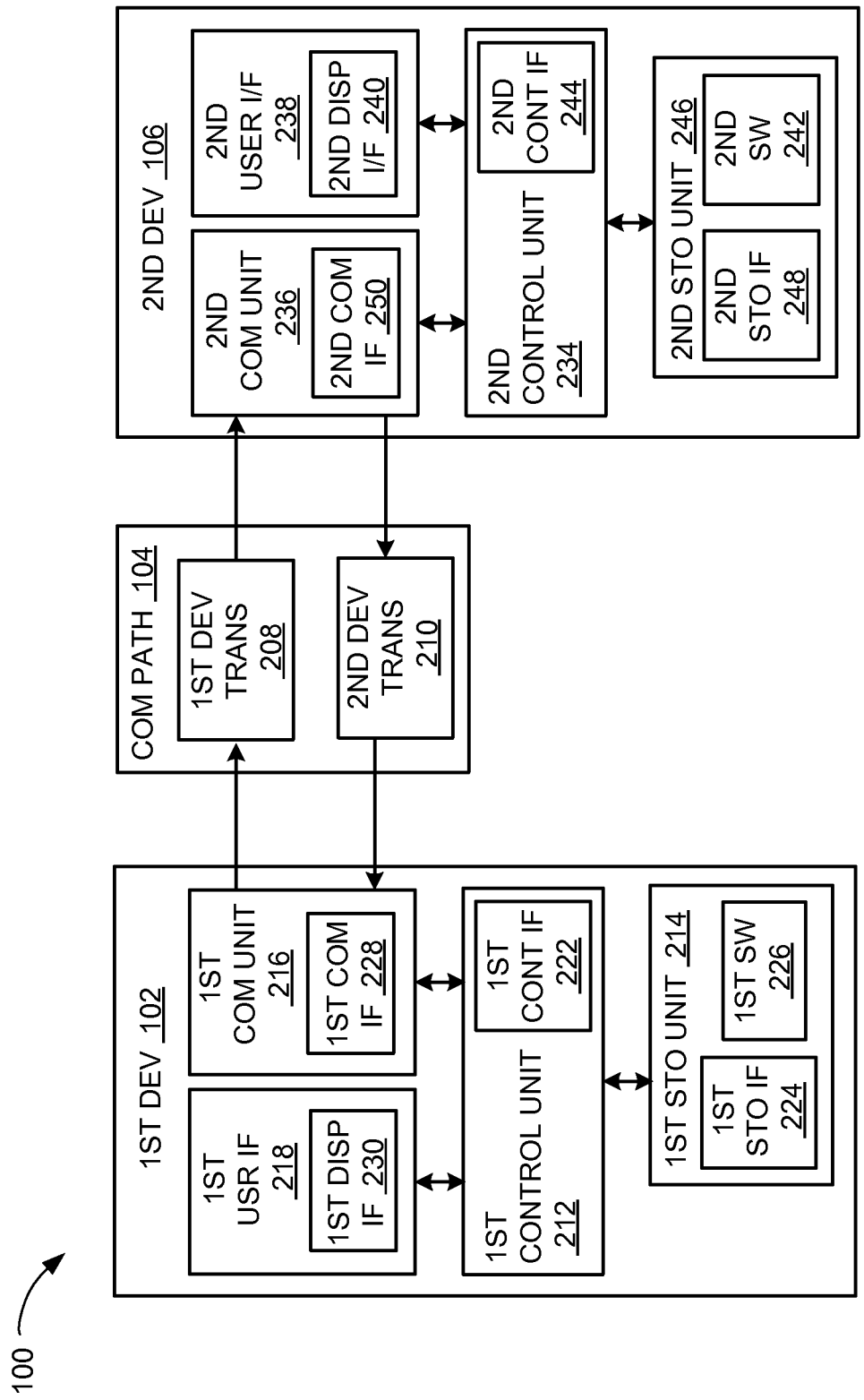
FIG. 2 is an exemplary block diagram of the communication system.

Referring now to FIG. 2, therein is shown an exemplary block diagram of the communication system 100. The communication system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the communication system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the communication system 100. The first control unit 212 can also execute the first software 226 for the other functions of the communication system 100. The first control unit 212 can further execute the first software 226 for interaction with the communication path 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the communication system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the communication system 100 is shown with the second storage unit 246 as a single hierarchy storage system, although it is understood that the communication system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as nonvolatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The communication system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the communication system 100 is described by operation of the first device 102 and the second device 106. It is understood that the first device 102 and the second device 106 can operate any of the modules and functions of the communication system 100.

Figure 3:
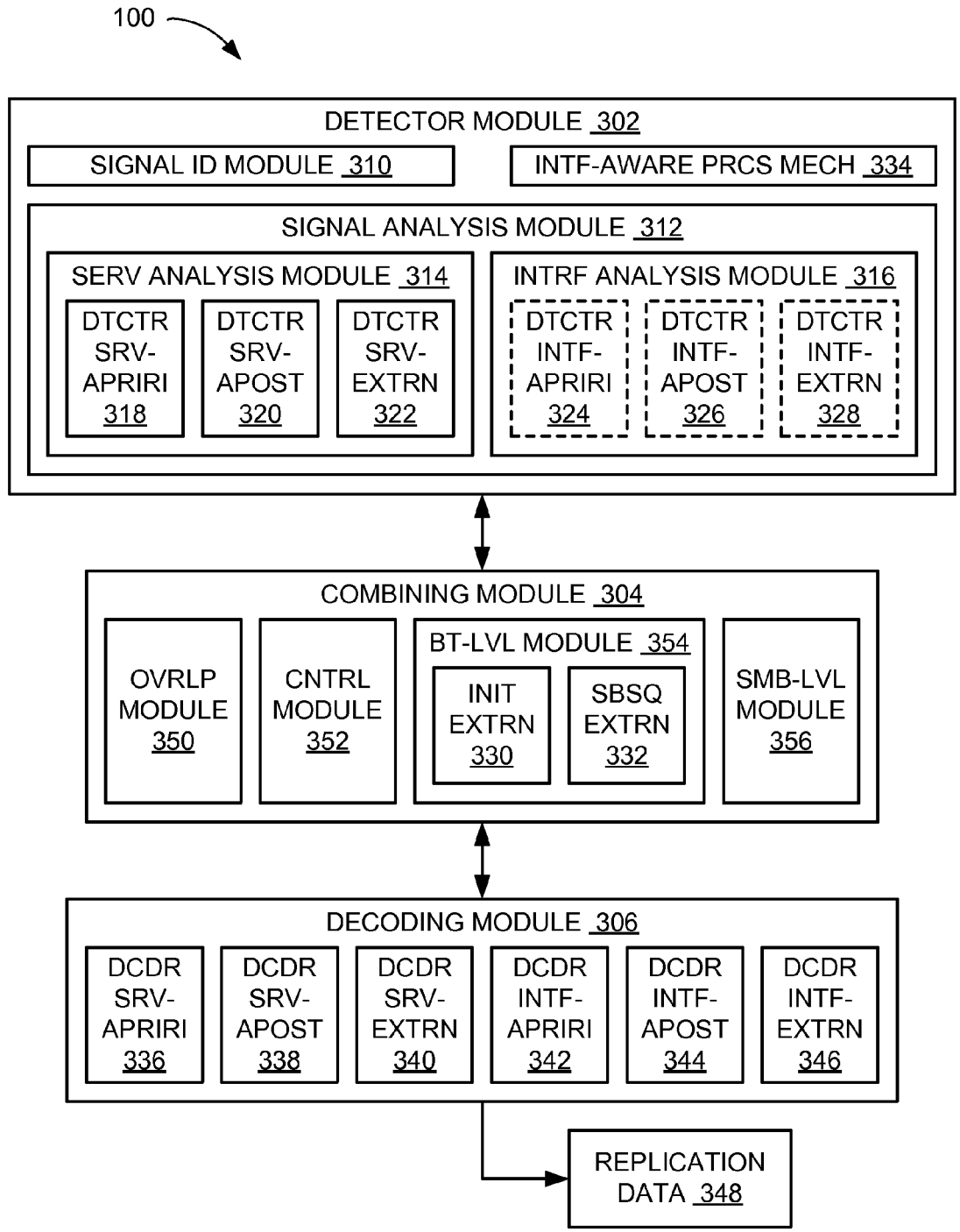
FIG. 3 is a control flow of the communication system.

Referring now to FIG. 3, therein is shown a control flow of the communication system 100. The communication system 100 can include a detector module 302, a combining module 304, and a decoding module 306.

The detector module 302 can be coupled to the combining module 304. For example, one or more outputs of the detector module 302 can be connected to one or more inputs of the combining module 304, one or more inputs of the detector module 302 can be connected to one or more outputs of the combining module 304, or a combination thereof. Similarly, the combining module 304 can be coupled to the decoding module 306.

The detector module 302 is configured to detect, demodulate, or a combination thereof for signals received by the mobile device 102 of FIG. 1. The detector module 302 can detect an initial instance of the receiver signal 118 of FIG. 1 and the repeat response 134 of FIG. 1 corresponding to the receiver signal 118.

The detector module 302 can detect signals and variations in frequency, magnitude, phase, signal shape, timing, or a combination thereof. The detector module 302 can demodulate by extracting original information, such as the symbol-level information 111 of FIG. 1 from a carrier frequency, a time slot, a multiplex identification code, or a combination thereof.

The detector module 302 can further process the receiver signal 118, the repeat response 134, or a combination thereof for information corresponding to the serving portion 120 of FIG. 1, the interference portion 122 of FIG. 1, or a combination thereof. The detector module 302 can include a signal identification module 310 and a signal analysis module 312 for processing the receiver signal 118, the repeat response 134, or a combination thereof.

The signal identification module 310 is configured to identify and receive the receiver signal 118, the repeat response 134, or a combination thereof. The receiver signal 118 can precede the repeat response 134. The communication system 100 can process the repeat request 132 of FIG. 1, including communicating the repeat request 132, when the communication system 100 detects an error in processing the receiver signal 118 or a portion therein. The signal identification module 310 can further identify and receive the repeat response 134 corresponding to the repeat request 132 associated with the receiver signal 118.

The signal identification module 310 can identify the receiver signal 118, the repeat response 134, or a combination thereof by tracking the repeat request 132. The signal identification module 310 can further identify the receiver signal 118, the repeat response 134, or a combination thereof by processing a portion of signals, such as a reference portion, a header portion, a format portion, or a combination thereof, arriving after the repeat request 132.

For example, the signal identification module 310 can identify an instance of received signal associated with detection of error during processing as the receiver signal 118. Also for example, the signal identification module 310 can identify an instance of received signal occurring after the repeat request 132 and having an indication noting the repeat request 132, the receiver signal 118, or a combination thereof therein as the repeat response 134.

The signal identification module 310 can receive by allowing the receiver signal 118, the repeat response 134, or a combination thereof for further processing. For example, the signal identification module 310 can store the receiver signal 118, the repeat response 134, or a combination thereof in the first storage unit 214 of FIG. 2, the second storage unit 246 of FIG. 2, or a combination thereof at a location accessible to other modules for further processing. Also for example, the signal identification module 310 can use the first communication unit 216 of FIG. 2, the second communication unit 236 of FIG. 2, the first control unit 212 of FIG. 2, the second control unit 234 of FIG. 2, or a combination thereof to pass the receiver signal 118, the repeat response 134, or a combination thereof to other modules for further processing.

The signal analysis module 312 is configured to identify various components within the receiver signal 118, the repeat response 134, or a combination thereof. The signal analysis module 312 can be configured to determine the serving portion 120 including the serving data 124 of FIG. 1 or the serving channel estimate 126 of FIG. 1, determine the interference portion 122 including the interference data 128 of FIG. 1 or the interference channel estimate 130 of FIG. 1, or a combination thereof from the receiver signal 118, the repeat response 134, or a combination thereof.

The signal analysis module 312 can determine the serving portion 120, the interference portion 122, a portion therein, or a combination thereof using a serving analysis module 314 and an interference analysis module 316. The serving analysis module 314 is configured to determine information regarding the serving portion 120, the transmitter channel 110 of FIG. 1, or a combination thereof.

The serving analysis module 314 can determine information regarding the transmitter channel 110 by estimating the serving channel estimate 126. The serving analysis module 314 can estimate the serving channel estimate 126 using a variety of methods.

For example, the serving analysis module 314 can use reference communications, such as pilot tone or reference signal, transmitted by the base station 106 of FIG. 1 to determine the serving channel estimate 126. The details regarding transmitted reference communications, such as original frequency, phase, content, or a combination thereof, can be predetermined by the communication standard, the communication system 100, or a combination thereof.

Continuing with the example, the serving analysis module 314 can compare the received instances of the reference communications to the parameters predetermined by the communication standard, the communication system 100, or a combination thereof for the reference communications. The serving analysis module 314 can calculate the changes in magnitude, frequency, phase, or a combination thereof in the reference communication of the received instances of the reference communications, such as contained in the receiver signal 118 or the repeat response 134.

Continuing with the example, the serving analysis module 314 can further use frequency or time domain transformation, convolution, transposition, basic mathematical operations, or a combination thereof with the predetermined or received instances of the reference communication, or both. The serving analysis module 314 can also use methods such as the least square method, the least mean square (LMS) method, or the minimum mean square error (MMSE) method to determine the serving channel estimate 126.

The serving analysis module 314 can further determine information regarding the serving portion 120 by calculating a detector serving-a-priori value 318, a detector serving-a-posteriori value 320, and a detector serving-extrinsic value 322. The detector serving-a-priori value 318 is a prior knowledge for the detector module 302 or a portion therein, such as the serving analysis module 314, about the transmitter signal 108 of FIG. 1, the receiver signal 118, the repeat response 134, or a combination thereof.

The detector serving-a-priori value 318 can be a measure of confidence level associated with a specific portion of the transmitter signal 108, the receiver signal 118, the repeat response 134, or a combination thereof corresponding to a specific value of a symbol, a bit, or a combination thereof. The detector serving-a-priori value 318 can be a ratio of likelihoods, a logarithmic derivation thereof, such as a log-likelihood ratio (LLR), or a combination thereof for a specific portion of the transmitter signal 108, the receiver signal 118, the repeat response 134, or a combination thereof corresponding to a specific value of information.

For example, the detector serving-a-priori value 318 can represent one or a set of likelihoods of the specific portion the transmitter signal 108, the receiver signal 118, the repeat response 134, or a combination thereof corresponding to a specific instance of a symbol, corresponding to all possible symbols, corresponding to a '1' or '0' bit, or a combination thereof. Also for example, the detector serving-a-priori value 318 can represent a likelihood that the specific portion corresponds to a group of bits in a specific sequence of '1' and '0'.

The detector serving-a-priori value 318, as a log-likelihood ratio, can be expressed as:

$$L_{m,n}^{(a,1,k)} = \log \frac{P(b_{m,n}^k = +1)}{P(b_{m,n}^k = -1)}.$$

Equation (2)

The detector serving-a-priori value 318 can represent a log of a ratio of likelihoods for an $m^{th}$ bit in the $n^{th}$ stream at the $k^{th}$ signal. The detector serving-a-priori value 318 can be a ratio of likelihoods that the bit is 1 or a 0, represented as +1 or −1. The superscript 'k' can be 'I' for interference signals or 'D' for intended signals. For the detector serving-a-priori value 318, the superscript 'k' can be represented with 'D'.

The serving analysis module 314 can receive the detector serving-a-priori value 318 from a source external to the serving analysis module 314, such as the interference analysis module 316, the combining module 304, the decoding module, or a combination thereof. The serving analysis module 314 can also receive the detector serving-a-priori value 318 from a result calculated on a previous iteration by the serving analysis module 314, the interference analysis module 316, the combining module 304, the decoding module 306, or a combination thereof.

The serving analysis module 314 can also initialize the detector serving-a-priori value 318 to a value predetermined by the communication system 100, a value resulting from demodulating or detecting the receiver signal 118, the repeat response 134, or a combination thereof, a value resulting from estimating the serving channel estimate 126, or a combination thereof. The serving analysis module 314 can initialize or reset the detector serving-a-priori value 318 when the communication system 100 is initialized, reset, performs a handover process, or a combination thereof.

The serving analysis module 314 can calculate the detector serving-a-posteriori value 320. The detector serving-a-posteriori value 320 is a later knowledge for the detector module 302 or a component therein, such as the serving analysis module 314, about the transmitter signal 108, the receiver signal 118, the repeat response 134, or a combination thereof.

The detector serving-a-posteriori value 320 can be a measure of confidence level associated with a specific portion of the transmitter signal 108, the receiver signal 118, the repeat response 134, or a combination thereof corresponding to a specific value of a symbol, a bit, or a combination thereof. The detector serving-a-posteriori value 320 can be a ratio of likelihoods, a logarithmic derivation thereof, such as a log-likelihood ratio (LLR), or a combination thereof for a likelihood that a specific portion of the transmitter signal 108, the receiver signal 118, the repeat response 134, or a combination thereof corresponding to a specific value of information.

For example, the detector serving-a-posteriori value 320 can represent one or a set of likelihoods of the specific portion the transmitter signal 108, the receiver signal 118, the repeat response 134, or a combination thereof corresponding to a specific instance of a symbol, corresponding to each and all possible symbols, corresponding to a '1' or '0' bit, or a combination thereof. Also for example, the detector serving-a-posteriori value 320 can represent a likelihood that the specific portion corresponds to a group of bits in a specific sequence of '1' and '0'.

The detector serving-a-posteriori value 320, as a log-likelihood ratio, can be expressed as:

$$L_{m,n}^{(A,1,D)} = \log\frac{P(b_{m,n}^D=+1\,|\,y)}{P(b_{m,n}^D=-1\,|\,y)} = \log\frac{\Sigma_{b^I}\Sigma_{b^D\in B_{m,n}^{+1}}P(y\,|\,b^Db^I)P(b^D,b^I)}{\Sigma_{b^I}\Sigma_{b^D\in B_{m,n}^{-1}}P(y\,|\,b^Db^I)P(b^D,b^I)}.$$ Equation (3)

The receiver signal 118 can be represented by y. The notation 'D' can specify correspondence or association to the serving data 124, the transmitter signal 108, or a combination thereof intended for communication. The notation 'I' can specify correspondence or association to the interference data 128, the interference signal 114 of FIG. 1, or a combination thereof unintended for communication and serving as an interference to the intended communication. The terms '$b^D$' and '$b^I$' can represent bit vectors consisting of all bits corresponding to the symbol element of '$x_D$,' and '$x_I$'.

The detector serving-a-posteriori value 320 can be approximated as:

$$L_{m,n}^{(A,1,D)} \approx \max_{x^D\in\chi_{m,n}^{+1}}J(\mathcal{D}x+\mathcal{L}^{(a,1)}) - \max_{x^D\in\chi_{m,n}^{-1}}J(\mathcal{D}x+\mathcal{L}^{(a,1)})$$ Equation (4)

The term '$\mathcal{D}x$' can represent a Euclidean distance expressed as:

$$\mathcal{D}x = -\|y - H_Dx_D - H_Ix_I\|^2.$$ Equation (5).

The term '$\mathcal{L}$' can represent a sum of bit vectors expressed as:

$$\mathcal{L}^{(a,1)} = \frac{1}{2}b^{I+}L^{(a,1,I)} + \frac{1}{2}b^{D+}L^{(a,1,D)}.$$ Equation (6)

Further, the term '$\mathcal{B}_{m,n}^b$' can represent:

$$\mathcal{B}_{m,n}^b = \{b^D|b_{m,n}=b\}.$$ Equation (7).

The term '$\chi hd\ m,n^b$' can represent:

$$\chi_{m,n}^b = \{x^D|b_{m,n}=b\}$$ Equation (8).

The serving analysis module 314 can calculate the detector serving-a-posteriori value 320 with the first communication unit 216, the second communication unit 236, the first control unit 212, the second control unit 234, or a combination thereof using one or more equation from Equations (3)-(8). The serving analysis module 314 can further store the detector serving-a-posteriori value 320 in the first storage unit 214, the second storage unit 246, or a combination thereof.

The serving analysis module 314 can further calculate the detector serving-extrinsic value 322. The detector serving-extrinsic value 322 is new information that is not derived from received information with respect to the detector module 302 or a portion therein, such as the serving analysis module 314.

The detector serving-extrinsic value 322 can be a calculated or estimated value. The detector serving-extrinsic value 322 can represent an error, an improvement, or a difference between instances of processing or calculated results. The detector serving-extrinsic value 322 can be a difference between the detector serving-a-posteriori value 320 and the detector serving-a-priori value 318. The detector serving-extrinsic value 322 can be expressed as:

$$L_{m,n}^{(ext,1,k)} = L_{m,n}^{(A,1,k)} - L_{m,n}^{(a,1,k)}.$$ Equation (9).

The superscript 'k' can be 'I' for interference signals or 'D' for intended signals. For the detector serving-extrinsic value 322, the superscript 'k' can be represented with 'D'.

The serving analysis module 314 can calculate the detector serving-extrinsic value 322 with the first communication unit 216, the second communication unit 236, the first control unit 212, the second control unit 234, or a combination thereof using Equation (9) or other equations or methods, such as using noise variance, the serving channel estimate 126, the interference channel estimate 130, a-priori or a-posteriori values, or a combination thereof. The serving analysis module 314 can further store the detector serving-extrinsic value 322 in the first storage unit 214, the second storage unit 246, or a combination thereof.

The interference analysis module 316 is configured to determine information regarding the interference portion 122, the interference channel 116 of FIG. 1, or a combination thereof. The interference analysis module 316 can be similar to the serving analysis module 314 but for the interference portion 122 and the interference channel 116 instead of the serving portion 120 and the transmitter channel 110.

The interference analysis module 316 can determine information regarding the interference channel 116 by estimating the interference channel estimate 130. The interference analysis module 316 can estimate the interference channel estimate 130 using a variety of methods similar to the ones described above for estimating the serving channel estimate 126.

The interference analysis module 316 can further determine information regarding the interference portion 122 by calculating a detector interference-a-priori value 324, a detector interference-a-posteriori value 326, and a detector interference-extrinsic value 328. The detector interference-a-priori value 324 is a prior knowledge for the detector module 302 or a portion therein, such as the interference analysis module 316, about the interference signal 114, the receiver signal 118, the repeat response 134, or a combination thereof.

The detector interference-a-priori value 324 can be similar to the detector serving-a-priori value 318 but regarding the interference signal 114 instead of the transmitter signal 108. For example, the detector interference-a-priori value 324 can be a measure of confidence level, such as an LLR value, associated with a specific portion of the receiver signal 118, the repeat response 134, or a combination thereof corresponding to the interference signal 114. Also for example, the detector interference-a-priori value 324 can be expressed using Equation (2), but with the superscript 'k' represented with 'I'.

Further, the interference analysis module 316 can similarly receive the detector interference-a-priori value 324 from an external source, or based on a result from a previous iteration by the interference analysis module 316, the external source, or a combination thereof. Moreover, the interference analysis module 316 can similarly initialize the detector interference-a-priori value 324.

The interference analysis module 316 can determine the detector interference-a-posteriori value 326. The detector interference-a-posteriori value 326 is a later knowledge for the detector module 302 or a component therein, such as the interference analysis module 316, about the interference signal 114, the receiver signal 118, the repeat response 134, or a combination thereof.

The detector interference-a-posteriori value 326 can be a soft estimate similar to the detector serving-a-posteriori value 320 but regarding the interference signal 114 instead of the transmitter signal 108. For example, the detector interference-a-posteriori value 326 can be a measure of confidence level, including an LLR value, for a specific portion of the receiver signal 118, the repeat response 134, or a combination thereof corresponding to a specific value of information corresponding to the interference signal 114 or a portion therein. Also for example, the detector interference-a-posteriori value 326 can be expressed using one or more equations from Equations (3)-(8), but adjusted for the interference signal 114 instead of the transmitter signal 108.

The interference analysis module 316 can similarly calculate the detector interference-a-posteriori value 326 with the first communication unit 216, the second communication unit 236, the first control unit 212, the second control unit 234, or a combination thereof using Equation (3) or (4) adjusted for the interference signal 114. The interference analysis module 316 can store the detector interference-a-posteriori value 326 in the first storage unit 214, the second storage unit 246, or a combination thereof.

The interference analysis module 316 can further calculate the detector interference-extrinsic value 328. The detector interference-extrinsic value 328 is new information that is not derived from received information with respect to the detector module 302 or a portion therein, such as the interference analysis module 316.

The detector interference-extrinsic value 328 can be a calculated or estimated value similar to the detector serving-extrinsic value 322 but for the interference signal 114 instead of the transmitter signal 108. The detector interference-extrinsic value 328 can be a soft estimate representing an error, an improvement, or a difference between instances of processing or calculated results. The detector interference-extrinsic value 328 can be a difference between the detector interference-a-posteriori value 326 and the detector interference-a-priori value 324. The detector interference-extrinsic value 328 can be expressed using Equation (9) with the superscript 'k' represented by 'I'.

The interference analysis module 316 can similarly calculate the detector interference-extrinsic value 328 with the first communication unit 216, the second communication unit 236, the first control unit 212, the second control unit 234, or a combination thereof using Equation (9) adjusted for the interference signal, or other equations or methods, such as using noise variance, the serving channel estimate 126, the interference channel estimate 130, a-priori or a-posteriori values, or a combination thereof. The interference analysis module 316 can store the detector interference-extrinsic value 328 in the first storage unit 214, the second storage unit 246, or a combination thereof.

The signal analysis module 312 can use the serving analysis module 314, the interference analysis module 316, or a combination thereof to process the receiver signal 118, the repeat response 134, or a combination thereof. For example, the signal analysis module 312 can calculate an initial extrinsic value 330 based on the receiver signal 118, a subsequent extrinsic value 332 based on the repeat response 134, or a combination thereof.

As a more specific example, the initial extrinsic value 330 can be the detector serving-a-posteriori value 320 or the detector serving-extrinsic value 322 calculated by the serving analysis module 314, the detector interference-a-posteriori value 326 or the detector interference-extrinsic value 328 calculated by the interference analysis module 316, or a combination thereof calculated from the receiver signal 118. As a further specific example, the subsequent extrinsic value 332 can be the detector serving-a-posteriori value 320 or the detector serving-extrinsic value 322 calculated by the serving analysis module 314, the detector interference-a-posteriori value 326 or the detector interference-extrinsic value 328 calculated by the interference analysis module 316, or a combination thereof calculated from the repeat response 134.

The signal analysis module 312 can further implement an interference-aware processing mechanism 334 through the serving analysis module 314, the interference analysis module 316, or a combination thereof for determining the serving portion 120, the interference portion 122, a portion therein, or a combination thereof.

The interference-aware processing mechanism 334 is a method or a set of instructions for determining and utilizing both the serving portion 120 and the interference portion 122 within the receiver signal 118, the repeat response 134, or a combination thereof. The interference-aware processing mechanism 334 can have the communication system 100 determine, estimate, calculate, or a combination thereof for the serving data 124, the serving channel estimate 126, or a combination thereof and the interference data 128, the interference channel estimate 130, or a combination thereof.

The interference-aware processing mechanism 334 can have the communication system 100 utilize the serving data 124, the serving channel estimate 126, or a combination thereof to determine or adjust the interference data 128, the interference channel estimate 130, or a combination thereof. The interference-aware processing mechanism 334 can also have the communication system 100 utilize the interference data 128, the interference channel estimate 130, or a combination thereof to determine or adjust the serving data 124, the serving channel estimate 126, or a combination thereof.

The interference-aware processing mechanism 334 can have the communication system 100 determine and utilize the interference portion 122 instead of processing the interference portion 122 as a noise parameter, an artifact in the serving channel estimate 126, or a combination thereof. The detector module 302 can have the interference-aware processing mechanism 334 stored in the first storage unit 214, the second storage unit 246, or a combination thereof.

The communication system 100 can have the detector module 302 implement all or a portion of the interference-aware processing mechanism 334 using the first communication unit 216, the second communication unit 236, the first control unit 212, the second control unit 234, or a combination thereof. The detector module 302 can be an interference-aware detector, a detector within iterative or joint detector-decoder architecture, or a combination thereof. The detector module 302 can also treat the serving portion 120 and the interference portion 122 as different layers within a signal, successively decode the serving portion 120 and the interference portion 122, or a combination thereof.

After processing the receiver signal 118, the repeat response 134, or a combination thereof, the control flow can be passed to the combining module 304. The control flow can pass by having processing results, such as the detector serving-a-posteriori value 320, the detector serving-extrinsic value 322, the detector interference-a-posteriori value 326, detector interference-extrinsic value 328, or a combination thereof pass from the detector module 302 to the combining module 304, by storing the processing results at a location known and accessible to the combining module 304, by notifying the combining module 304, such as by using a flag, an interrupt, a status signal, or a combination, or a combination of processes thereof.

The combining module 304 is configured to combine processing results across multiple transmissions, multiple modules or iterations, or a combination thereof. For example, the combining module 304 can check for errors, interleave, de-interleave, or a combination thereof for results of the detector module 302, the decoding module 306, or a combination thereof. Also for example, the combining module 304 can combine processing results from the detector module 302, the decoding module 306, or a combination thereof for the receiver signal 118, the repeat response 134, across iterations of one or more modules, or a combination thereof.

As a more specific example, the combining module 304 can check for errors by performing cyclic redundancy check (CRC), check sum error check, or a combination thereof. For a further specific example, the combining module 304 can interleave, de-interleave, or a combination thereof for results of the detector module 302, results of the decoding module 306, resulting bits, resulting symbols, or a combination thereof by rearranging the order thereof. The combining module 304 can interleave, de-interleave, or a combination thereof according to various coding schemes, including turbo coding.

The combining module 304 can be configured to combine processing results across the receiver signal 118 and the repeat response 134. For example, the combining module 304 can combine the repeat response 134 and the receiver signal 118 based on combining the serving data 124, the serving channel estimate 126, the interference channel estimate 130, the interference data 128, or a combination thereof. Details for combining processes will be described below.

The decoding module 306 is configured to decode signals detected by the communication system 100. The decoding module can be configured to decode the receiver signal 118, the repeat response 134, or a combination thereof.

The decoding module 306 can decode signals by calculating a decoder serving-a-priori value 336, a decoder serving-a-posteriori value 338, a decoder serving-extrinsic value 340, a decoder interference-a-priori value 342, a decoder interference-a-posteriori value 344, a decoder interference-extrinsic value 346, or a combination thereof. The decoder serving-a-priori value 336 is a prior knowledge for the decoding module 306 about the transmitter signal 108, the receiver signal 118, the repeat response 134, or a combination thereof.

The decoder serving-a-priori value 336 can be similar to the detector serving-a-priori value 318 but with respect to the decoding module 306 instead of the detector module 302. For example, the decoder serving-a-priori value 336 can be a measure of confidence level, including an LLR value, associated with a specific portion of the transmitter signal 108, the receiver signal 118, the repeat response 134, or a combination thereof corresponding to a specific value of a symbol, a bit, or a combination thereof regarding the transmitter signal 108. Also for example, the decoder serving-a-priori value 336 can be expressed as same as Equation (2) but with $L_{m,n}^{(a,2,D)}$ representing the decoder serving-a-priori value 336 in place of $L_{m,n}^{(a,1,D)}$ for the detector serving-a-priori value 318.

The decoder interference-a-priori value 342 is a prior knowledge for the decoding module 306 about the interference signal 114, the receiver signal 118, the repeat response 134, or a combination thereof. The decoder interference-a-priori value 342 can be similar to the decoder serving-a-priori value 336 but for the interference signal 114 instead of the transmitter signal 108. The decoder interference-a-priori value 342 can also be similar to the detector interference-a-priori value 324 but with respect to the decoding module 306 instead of the detector module 302.

For example, the decoder interference-a-priori value 342 can be a measure of confidence level, including an LLR value, associated with a specific portion of the interference signal 114, the receiver signal 118, the repeat response 134, or a combination thereof corresponding to a specific value of a symbol, a bit, or a combination thereof. Also for example, the decoder interference-a-priori value 342 can be similarly expressed using Equation (2) but with $L_{m,n}^{(a,2,D)}$ representing the decoder serving-a-priori value 336 in place of $L_{m,n}^{(a,1,D)}$ for the detector serving-a-priori value 318.

The decoding module 306 can receive the decoder serving-a-priori value 336, the decoder interference-a-priori value 342, or a combination thereof from a source external to the decoding module 306, such as the combining module 304 or the decoding module. The decoding module 306 can also receive the decoder serving-a-priori value 336, the decoder interference-a-priori value 342, or a combination thereof from a result calculated on a previous iteration by the decoding module 306, the combining module 304, the detector module 302, or a combination thereof.

The decoding module 306 can also initialize the decoder serving-a-priori value 336, the decoder interference-a-priori value 342, or a combination thereof. The initialization process or the value can be similar to that of the detector module 302.

The decoding module 306 can calculate the decoder serving-a-posteriori value 338, the decoder interference-a-posteriori value 344, or a combination thereof. The decoder serving-a-posteriori value 338 is a later knowledge for the decoding module 308 about the transmitter signal 108, the receiver signal 118, the repeat response 134, or a combination thereof. The decoder interference-a-posteriori value 344 is a later knowledge for the decoding module 308 about the interference signal 114, the receiver signal 118, the repeat response 134, or a combination thereof.

The decoder serving-a-posteriori value 338 can be similar to the detector serving-a-posteriori value 320 but for the decoding module 306 instead of the detector module 302. For example, the decoder serving-a-posteriori value 338 can be a measure of confidence level, including an LLR value, associated with a specific portion of the transmitter signal 108, the receiver signal 118, the repeat response 134, or a combination thereof corresponding to a specific value of a symbol, a bit, or a combination thereof. Also for example, the decoder serving-a-posteriori value 338 can be expressed using Equation (3), (4), or a combination thereof, but with $L_{m,n}^{(A,2,D)}$ representing the decoder serving-a-posteriori value 338 in place of $L_{m,n}^{(A,1,D)}$ for the detector serving-a-posteriori value 320.

The decoder interference-a-posteriori value 344 can be similar to the decoder serving-a-posteriori value 338 but for the interference signal 114 instead of the transmitter signal 108. The decoder interference-a-posteriori value 344 can also be similar to the detector interference-a-posteriori value 326 but with respect to the decoding module 306 instead of the detector module 302.

For example, the decoder interference-a-posteriori value 344 can be a measure of confidence level, including an LLR value, associated with a specific portion of the interference signal 114, the receiver signal 118, the repeat response 134, or a combination thereof corresponding to a specific value of a symbol, a bit, or a combination thereof. Also for example, the decoder interference-a-posteriori value 344 can be expressed as same as Equation (3), (4), or a combination thereof but with $L_{m,n}^{(A,2,D)}$ representing the decoder serving a-posteriori value 338 in place of $L_{m,n}^{(A,1,D)}$ for the detector serving a-posteriori value 320.

The decoding module 306 can calculate the decoder serving-a-posteriori value 338, the decoder interference-a-posteriori value 344, or a combination thereof with the first communication unit 216, the second communication unit 236, the first control unit 212, the second control unit 234, or a combination thereof using one or more equation from Equation (3)-(8). The decoding module 306 can further store the decoder serving-a-posteriori value 338, the decoder interference-a-posteriori value 344, or a combination thereof in the first storage unit 214, the second storage unit 246, or a combination thereof.

The decoding module 306 can further calculate the decoder serving-extrinsic value 340, the decoder interference-extrinsic value 346, or a combination thereof. The decoder serving-extrinsic value 340 is new information that is not derived from received information with respect to the decoding module 306. The decoder interference-extrinsic value 346 is new information that is not derived from received information with respect to the decoding module 306.

The decoder serving-extrinsic value 340 can be similar to the detector serving-extrinsic value 322 but for the decoding module 306 instead of the detector module 302. For example, the decoder serving-extrinsic value 340 can be a calculated or estimated value representing an error, an improvement, or a difference between instances of processing or calculated results regarding the transmitter signal 108. Also for example, the decoder serving-extrinsic value 340 can be expressed using Equation (9) with $L_{m,n}^{(ext,2,D)}$ representing the decoder serving-extrinsic value 340 in place of $L_{m,n}^{(ext,1,D)}$ for the detector serving-extrinsic value 322.

The decoder interference-extrinsic value 346 can be similar to the decoder serving-extrinsic value 340 but for the interference signal 114 instead of the transmitter signal 108. The decoder interference-extrinsic value 346 can also be similar to the detector interference-extrinsic value 328 but with respect to the decoding module 306 instead of the detector module 302.

For example, the decoder interference-extrinsic value 346 can a calculated or estimated value representing an error, an improvement, or a difference between instances of processing or calculated results regarding the interference signal 114. Also for example, the decoder interference-extrinsic value 346 can be expressed using Equation (9) with $L_{m,n}^{(ext,2,D)}$ representing the decoder interference-extrinsic value 346 in place of $L_{m,n}^{(ext,1,D)}$ for the detector interference-extrinsic value 328.

The decoding module 306 can calculate the decoder serving-a-priori value 336, the decoder serving-a-posteriori value 338, the decoder serving-extrinsic value 340, the decoder interference-a-priori value 342, the decoder interference-a-posteriori value 344, the decoder interference-extrinsic value 346, or a combination thereof using the interference-aware processing mechanism 334.

The communication system 100 can have the decoding module 306 implement all or a portion of the interference-aware processing mechanism 334 using the first communication unit 216, the second communication unit 236, the first control unit 212, the second control unit 234, or a combination thereof. The decoding module 306 can be an interference-aware decoder, a decoder within iterative or joint detector-decoder architecture, or a combination thereof. The decoding module 306 can also treat the serving portion 120 and the interference portion 122 as different layers within a signal, successively decode the serving portion 120 and the interference portion 122, or a combination thereof.

The decoding module 306 can generate a replication data 348. The replication data 348 is a regenerated instance of the intended data in the transmitter signal 108. The replication data 348 can be the serving data 124 as originally intended in the transmitter signal 108.

The replication data 348 can be the result of successfully detecting and decoding the receiver signal 118, the repeat response 134, or a combination thereof. The replication data 348 can be the result satisfying an error check, such CRC or check sum.

The decoding module 306 can generate the replication data 348 by decoding the receiver signal 118, the repeat response 134, or a combination thereof. The decoding module 306 can further generate the replication data 348 by passing the result of the detection and decoding for further processing by the communication system 100, including by the mobile device 102, the base station 106, or a combination thereof.

The decoding module 306 can also generate the replication data 348 based on a combination of the receiver signal 118 and the repeat response 134. The decoding module 306 can generate the replication data 348 by decoding a result from the combining module 304 that incorporates and combines both the receiver signal 118 and the repeat response 134. The decoding module 306 can generate the replication data 348 based on incorporating and combining the receiver signal 118 and the repeat response 134 using the bit-level information 109 of FIG. 1, the symbol-level information 111, or a combination thereof.

The decoding module 306 can generate the replication data 348 using a result from the combining module 304 for combining various data. The combining module 304 can use an overlap module 350, a control module 352, a bit-level module 354, a symbol-level module 356, or a combination thereof to combine various data. The overlap module 350 is configured to determine an overlap region 140 of FIG. 1 between the receiver signal 118 and the repeat response 134.

The overlap module 350 is configured to identify the overlap region 140 between the receiver signal 118 and the repeat response 134. The overlap module 350 can identify the overlap region 140 by comparing the receiver signal 118 and the repeat response 134, processing results thereof, including results from the detector module 302, the decoding module 306 or a combination thereof.

The overlap module 350 can compare the detector serving-a-posteriori value 320, the detector serving-extrinsic value 322, the decoder serving-a-posteriori value 338, the decoder serving-extrinsic value 340, or a combination thereof corresponding to the receiver signal 118 to one or more values corresponding to the repeat response 134. The overlap module 350 can also compare the bit-level information 109, the symbol-level information 111, or a combination thereof decoded from the receiver signal 118 to the information decoded from the repeat response 134.

The overlap module 350 can identify the overlap region 140 using the first communication unit 216, the second communication unit 236, the first control unit 212, the second control unit 234, or a combination thereof to include a consecutive sequence for the bit-level information 109, the symbol-level information 111, or a combination thereof common in both the receiver signal 118 and the repeat response 134. The overlap region 140 can include the serving data 124 originally in the receiver signal 118 corresponding to the initial data 136 of FIG. 1 and repeated in the repeat response 134 corresponding to the repeat data 138 of FIG. 1.

The control module 352 is configured to manage the combining process for the receiver signal 118 and the repeat response 134. The control module 352 can manage the combining process by utilizing multiple combining methods, performing combination process for different portions within the receiver signal 118 and the repeat response 134, or a combination thereof.

For example, the control module 352 can combine the receiver signal 118 and the repeat response 134 for the bit-level information 109, the symbol-level information 111, or a combination thereof. As a more specific example, the control module 352 can manage the combining process to combine the repeat response 134 and the receiver signal 118 for the symbol-level information 111 only in the overlap region 140, combine for the bit-level information 109 only in the non-overlapping region 142 of FIG. 1, or a combination thereof.

The control module 352 can manage the combining process by using the first communication interface 228 of FIG. 2, the second communication interface 250 of FIG. 2, the first control interface 222 of FIG. 2, the second control interface 244 of FIG. 2, or a combination thereof to activate one or more modules to process the information, such as by passing necessary data or sending an enabling signal thereto. For example, the control module 352 can activate the bit-level module 354 for combining for the bit-level information 109, the symbol-level module 356 for combining for the symbol-level information 111, or a combination thereof.

It has been discovered that the control module 352 managing the combining process to combine for the symbol-level information 111 only in the overlap region 140, combine for the bit-level information 109 only in the non-overlapping region 142, or a combination thereof provides increased accuracy in regenerating intended signals at a receiver device. The control module 352 can utilize bit-level combining process and symbol-level combining process for portions that maximize the efficiency and accuracy of each process and minimize their individual weaknesses given the conditions surrounding the retransmissions, such as availability of repeated data.

The bit-level module 354 is configured to combine the repeat response 134 and the receiver signal 118 for the bit-level information 109. The bit-level module 354 can combine the repeat response 134 and the receiver signal 118 for the bit-level information 109 by applying Bayes' theorem to develop the extrinsic information of the desired signal.

The bit-level module 354 can send cause the detector module 302, such as by sending a signal or setting a bit, to modify the detector serving-extrinsic value 322. Alternatively, the bit-level module 354 can adjust the detector serving-extrinsic value 322. The bit-level module 354 can combine for the bit-level information 109 according to:

$$L_{m,n}^{(ext,1,D)} = \log \frac{P(\{y_k\}_{k=1}^{i} \mid b_{m,n}^{D} = +1)}{P(\{y_k\}_{k=1}^{i} \mid b_{m,n}^{D} = -1)} \approx$$

$$\sum_{k=1}^{i} \log \frac{P(y_k \mid b_{m,n}^{D} = +1)}{P(y_k \mid b_{m,n}^{D} = -1)} = \sum_{k=1}^{i} L_{m,n,k}^{(ext,1,D)}.$$

Equation (10)

The bit-level module 354 can update the detector serving-extrinsic value 322 following Equation (10) at each transmission, such as for the receiver signal 118 and the repeat response 134. The bit-level module 354 can add to a stored instance of the LLR that is the sum of extrinsic LLRs from the $1^{st}$ to $(i-1)^{th}$ transmission. The bit-level module 354 can add LLRs resulting from transmissions based on determination of the signal identification module 310, for transmissions received corresponding to the repeat request 132.

For example, the bit-level module 354 can store the detector serving-extrinsic value 322 as the initial extrinsic value 330 for the first transmission, such as for the receiver signal 118. The bit-level module 354 can receive the detector serving-extrinsic value 322 resulting from a subsequent transmission, including the repeat response 134, as the subsequent extrinsic value 332. The bit-level module 354 can add the initial extrinsic value 330 and the subsequent extrinsic value 332 and store the sum as a new and updated instance of the initial extrinsic value 330.

Continuing with the example, the combining module 304 can interleave the initial extrinsic value 330 as described above. After interleaving the combining module 304 can pass the initial extrinsic value 330 to the decoding module 306 for the decoding process.

The communication system 100 can use the interference portion 122 to calculate, determine, refine, adjust, or a combination of processes thereof in determining the serving data 124. The bit-level module 354 can utilize only the serving data 124 determined using the interference portion 122 for combining the receiver signal 118 and the repeat response 134 for the bit-level information 109.

The bit-level module 354 can use the first communication unit 216, the second communication unit 236, the first control unit 212, the second control unit 234, or a combination thereof to combine the detector serving-extrinsic value 322 across transmissions, such as for the initial extrinsic value 330 and the subsequent extrinsic value 332. The bit-level module 354 can store the resulting sum for the instances of the detector serving-extrinsic value 322, such as the new updated instance of the initial extrinsic value 330, in the first storage unit 214, the second storage unit 246, or a combination thereof.

It has been discovered that the bit-level module 354 combining the initial extrinsic value 330 and the subsequent extrinsic value 332 for the detector module 302 utilizing the interference-aware processing mechanism 334 provides lower error rate and increased throughput. The actual determination of the interference data 128 and the interference channel estimate 130, as opposed to treating them as part of noise or the serving channel estimate 126, and their use in determining the serving data 124 increases the accuracy of the serving data 124. The increased accuracy of determining the serving data 124 can reduce the number of retransmissions, which can increase the throughput for the communication system 100.

The symbol-level module 356 is configured to combine the receiver signal 118 and the repeat response 134 for the symbol-level information 111. The symbol-level module 356 can have a variety of methods for combining the receiver signal 118 and the repeat response 134. Details regarding the symbol-level module 356 will be discussed below.

Referring now to FIG. 4, therein is shown a further control flow of the communication system 100. The communication system 100 can include the detector module 302, the combining module 304, and the decoding module 306 as shown in FIG. 3. The detector module 302 and the decoding module 306 can be similar to the description given above.

The detector module 302 can determine an initial-interference-channel 402, a subsequent-interference-channel 404, or a combination thereof. The initial-interference-channel 402 can be the interference channel estimate 130 of FIG. 1 corresponding to the receiver signal 118 of FIG. 1 and the subsequent-interference-channel 404 can be the interference channel estimate 130 corresponding to the repeat response 134 of FIG. 1. The detector module 302 can determine the initial-interference-channel 402, the subsequent-interference-channel 404, or a combination thereof as described above.

For example, the interference analysis module 316 of FIG. 3 can be configured to determine the initial-interference-channel 402 representing the interference channel estimate 130 associated with the receiver signal 118 using reference communications, such as pilot tone or reference signal, transmitted by the base station 106 of FIG. 1. Also for example, the interference analysis module 316 can determine the subsequent-interference-channel 404 representing the interference channel estimate 130 associated with the repeat response 134.

The decoding module 306 can be configured to determine an initial-interference-data 406, a subsequent-interference-data 408, or a combination thereof. The initial-interference-data 406 can be the interference data 128 of FIG. 1 or a representation thereof determined from the interference portion 122 of FIG. 1 of the receiver signal 118. The subsequent-interference-data 408 can be the interference data 128 or a representation thereof corresponding to the repeat response 134.

The decoding module 306 can determine the initial-interference-data 406, the subsequent-interference-data 408, or a combination thereof as described above. For example, the decoding module 306 can determine the initial-interference-data 406, the subsequent-interference-data 408, or a combination thereof using the interference-aware processing mechanism 334 of FIG. 3 for determining the serving data 124 of FIG. 1, such as corresponding to the initial data 136 of FIG. 1 or the repeat data 138 of FIG. 1, the interference data 128, the initial data 136 of FIG. 1, the repeat data 138 of FIG. 1, or a combination thereof.

Also for example, the decoding module 306 can use the detector interference-a-posteriori value 326 of FIG. 3, the detector interference-extrinsic value 328 of FIG. 3, the decoder interference-a-posteriori value 344 of FIG. 3, the decoder interference-extrinsic value 346 of FIG. 3, or a combination thereof to determine the initial-interference-data 406, the subsequent-interference-data 408, or a combination thereof. As a more specific example, the decoding module 306 can assign the value of the detector interference-a-posteriori value 326, the detector interference-extrinsic value 328, the decoder interference-a-posteriori value 344, the decoder interference-extrinsic value 346, or a combination thereof as the initial-interference-data 406, the subsequent-interference-data 408, or a combination thereof.

As an example embodiment, the symbol-level module 356 can include a stacking module 410 of FIG. 4 configured to combine the repeat response 134 and the receiver signal 118 for the symbol-level information 111 of FIG. 1. The stacking module 410 can combine the repeat response 134 and the receiver signal 118 using the initial-interference-channel 402, the subsequent-interference-channel 404, the initial-interference-data 128, the subsequent-interference-data 408, or a combination thereof.

For example, the stacking module 410 can combine the initial-interference-data 406 with the subsequent-interference-data 408, combine the initial-interference-channel 402 with the subsequent-interference-channel 404, or a combination thereof. The stacking module 410 can use the first communication unit 216 of FIG. 2, the second communication unit 236 of FIG. 2, the first control unit 212 of FIG. 2, the second control unit 234 of FIG. 2, or a combination thereof to combine the repeat response 134 and the receiver signal 118.

The stacking module 410 can stack channel matrices, such as the serving channel estimate 126 of FIG. 1 or the interference channel estimate 130 for the receiver signal 118, the repeat response, or a combination thereof. The stacking module 410 can also stack received data, such as the serving data 124 or the interference data 128 for the receiver signal 118, the repeat response, or a combination thereof.

The stacking module 410 can stack by concatenating matrices for or adding newly received or determined information to previous that of previous transmissions to calculate a concatenation signal set 412 of FIG. 4. The concatenation signal set 412, including the receiver signal 118 and the repeat response 134, can include the initial-interference-channel 402, the initial-interference-data 406, the subsequent-interference-channel 404, the subsequent-interference-data 408, an initial-serving-channel 414 of FIG. 4, an initial-serving-data 416, a subsequent-serving-channel 418, a subsequent-serving-data 420, or a combination thereof.

The initial-serving-channel 414 and the initial-serving-data 416 can be the serving channel estimate 126 and the initial data 136, respectively, corresponding to the receiver signal 118. The subsequent-serving-channel 418 and the subsequent-serving-data 420 can be the repeat data 138 and the serving channel estimate 126, respectively, corresponding to the repeat response 134. The concatenation signal set 412 can be expressed up to the $i^{th}$ transmission as:

$$y_i^{acc} = \begin{bmatrix} y_1 \\ \vdots \\ y_i \end{bmatrix} = \begin{bmatrix} H_{D,1} & H_{I,1} & 0 & 0 \\ \vdots & 0 & \ddots & 0 \\ H_{D,i} & 0 & 0 & H_{I,i} \end{bmatrix} \begin{bmatrix} x_D \\ x_{I,1} \\ \vdots \\ x_{I,i} \end{bmatrix} + \begin{bmatrix} n_1 \\ \vdots \\ n_i \end{bmatrix} \quad \text{Equation (11)}$$

$$= H_{D,i}^{(s)} x_D + \sum_{k=1}^{i} H_{I,k}^{(s)} x_{I,k} + n_i^{(s)}.$$

For Equation (11), $y_i^{acc}$ can represent the concatenation signal set 412 as an accumulation of all instances of transmissions received for the communication system 100, or instances specific to the receiver signal 118 and instances of the repeat response 134. The terms $H_{D,i}^{(s)}$ $H_{I,k}^{s}$ can be the first and $(k+1)^{th}$ column sub-matrices of the concatenated channel matrix, respectively. Using the interference-aware processing mechanism 334, the stacking module 410, the detector module 302, the decoding module 306, or a combination thereof can use Equation (11) directly with Equation (4) to process the concatenation signal set 412.

The stacking module 410, the control module 352, the detector module 302, the decoding module 306, or a combination thereof can manage the control flow to calculate the detector serving-extrinsic value 322 of FIG. 3 and the detector interference-extrinsic value 328, expressed as $L_{m,n,i}^{(ext,1,D)}$ and $L_{m,n,i}^{(ext,1,I)}$, sequentially at the $i^{th}$ transmission where the transmission index k can be from 1 to i. The stacking module 410, the control module 352, the detector module 302, the decoding module 306, or a combination thereof can further use the interference-aware processing mechanism 334 to update a-priori information of $b^D$ and $b^{I,k}$ from the decoding module 306.

It has been discovered that the concatenation signal set 412 including the serving data 124, the serving channel estimate 126, the interference data 128, and the interference channel estimate 130 for all relevant transmissions processed with the interference-aware processing mechanism 334 provides accurate and speedy reproduction of the replication data 348 of FIG. 3. The concatenation signal set 412 processed with the interference-aware processing mechanism 334 generates optimal extrinsic LLR values, which increases the accuracy of the decoding process which reduces the number of retransmissions necessary for generating the replication data 348.

It has also been discovered that the concatenation signal set 412 including the serving data 124, the serving channel estimate 126, the interference data 128, and the interference channel estimate 130 increase efficiency for the communication system 100. The concatenation signal set 412 including the serving data 124, the serving channel estimate 126, the interference data 128, and the interference channel estimate 130 allow for the communication system 100 to fully utilize repeated data and combine the signals at the symbol-level information 111 of FIG. 1.

Referring now to FIG. 5, therein is shown a further control flow of the communication system 100. The communication system 100 can include the detector module 302, the combining module 304, and the decoding module 306 as shown in FIG. 3. The detector module 302 and the decoding module 306 can be similar to the description given above.

For example, the interference analysis module 316 of FIG. 3 can be configured to determine the initial-interference-channel 402 of FIG. 4 for representing the interference channel estimate 130 of FIG. 1 associated with the receiver signal 118 of FIG. 1. The interference analysis module 316 can determine the subsequent-interference-channel 404 of FIG. 4 for representing the interference channel estimate 130 associated with the repeat response 134 of FIG. 1, or a combination thereof as described above.

Also for example, the decoding module 306 can determine the initial-interference-data 406 of FIG. 4 based on the decoder interference-a-posteriori value 344 of FIG. 3, the decoder interference-extrinsic value 346 of FIG. 3, or a combination thereof associated with the receiver signal 118. The decoding module 306 can determine the subsequent-interference-data 408 of FIG. 4 based on the decoder interference-a-posteriori value 344, the decoder interference-extrinsic value 346, or a combination thereof associated with the receiver signal 118.

As an example embodiment, the symbol-level module 356 can include an interference cancellation module 502, a whitening module 504, and a cancellation combination module 506. The interference cancellation module 502 is configured to determine and remove the interference portion 122 of FIG. 1 from the receiver signal 118.

The interference cancellation module 502 can remove the interference portion 122 from the receiver signal 118 by calculating an initial-cancellation-product 508 from the receiver signal 118, the repeat response 134, or a combination thereof based on an initial-interference soft-estimate 510, the initial-interference-data 406, or a combination thereof. The initial-cancellation-product 508 is a remaining portion of the receiver signal 118 after removing the interference portion 122.

The initial-cancellation-product 508 can be an estimation of the serving portion 120 of FIG. 1 or the serving data 124 of FIG. 1 therein originally intended in the receiver signal 118. The interference cancellation module 502 can calculate the initial-cancellation-product 508 by removing the initial-interference-data 406, the initial-interference-channel 402, or a combination thereof from the receiver signal 118.

The interference cancellation module 502 can calculate the initial-cancellation-product 508 using the first communication unit 216 of FIG. 2, the second communication unit 236 of FIG. 2, the first control unit 212 of FIG. 2, the second control unit 234 of FIG. 2, or a combination thereof when the communication system 100 determines that the repeat request 132 of FIG. 1 is necessary and before receiving the next transmission, including the repeat response 134. The interference cancellation module 502 can store the initial-cancellation-product 508 in the first storage unit 214 of FIG. 2, the second storage unit 246 of FIG. 2, or a combination thereof.

The initial-cancellation-product 508 can be expressed as:

$$\acute{y}_i = y_i - H_{I,i}\bar{x}_{I,i} = H_{I,i}x_D + v_i.\qquad\text{Equation (12)}.$$

The term $v_i$ can represent residual interference and the received noise. The term $\bar{x}_{I,i}$ can represent a vector for the initial-interference soft-estimate 510 and its $n^{th}$ scalar element.

The initial-interference soft-estimate 510 is a likelihood, a likelihood-based derivation, or a combination thereof associated with the interference portion 122. The initial-interference soft-estimate 510 can be based on the initial-interference-data 406, the initial-interference-channel 402, or a combination thereof and represent a likelihood or a likelihood-based result of one or more possible or likely values for the initial-interference-data 406.

The initial-interference soft-estimate 510 can be expressed as:

$$\bar{x}_{I,i}(n) = E[x_{I,i}(n) \mid L^{(A,2,I)}] = \sum_{s_k \in e} s_k \prod_{m=1}^{M} \frac{1}{2}\left(1 + b_{m,n}^I \tanh\left(\frac{L_{m,n,i}^{(A,2,I)}}{2}\right)\right). \qquad\text{Equation (13)}$$

The term $e$ can refer to the set of M-ary QAM constellation points. The interference cancellation module 502 can calculate the initial-interference soft-estimate 510 using the decoder interference-a-posteriori value 344 corresponding to the $m^{th}$ bit of the $n^{th}$ symbol at the $i^{th}$ transmission, such as the receiver signal 118.

The interference cancellation module 502 can calculate the initial-interference soft-estimate 510 according to Equation (13) using the first communication unit 216, the second communication unit 236, the first control unit 212, the second control unit 234, or a combination thereof. The interference cancellation module 502 can store the initial-interference soft-estimate 510 in the first storage unit 214, the second storage unit 246, or a combination thereof. The interference cancellation module 502 can also discard the initial-interference soft-estimate 510 and only store the initial-cancellation-product 508.

The interference cancellation module 502 can similarly calculate a subsequent-interference soft-estimate 512 and a subsequent-cancellation-product 514 but for the repeat response 134 instead of the receiver signal 118. For example, the interference cancellation module 502 can use Equations (12)-(13), the subsequent-interference-data 408, or a combination thereof and processes corresponding thereto for the transmission corresponding to the repeat response 134 as described above. The interference cancellation module 502 can store the subsequent-interference soft-estimate 512, the subsequent-cancellation-product 514, or a combination thereof, discard the subsequent-cancellation-product 514, or a combination of processes thereof.

For example, the interference cancellation module 502 can calculate the subsequent-cancellation-product 514 from the repeat response 134 based on the subsequent-interference soft-estimate 512. The interference cancellation module 502 can calculate the subsequent-interference soft-estimate 512 based on the subsequent-interference-data, the subsequent-interference-channel 404, or a combination thereof.

It has been discovered that the initial-interference soft-estimate 510 and the subsequent-interference soft-estimate 512 provide increase in efficiency and accuracy in processing the receiver signal 118, the repeat response 134, or a combination thereof. The initial-interference soft-estimate 510 and the subsequent-interference soft-estimate 512 enable the communication system to directly use likelihood based calculations for the interference portion 122 according to the interference-aware processing mechanism 334 of FIG. 3. The initial-interference soft-estimate 510 and the subsequent-interference soft-estimate 512 can capture the benefits of an interference-aware receiver and utilize the information regarding the interference portion 122 to further refine the processing of the receiver signal 118, the repeat response 134, or a combination thereof.

It has also been discovered that the initial-cancellation-product 508 and the subsequent-cancellation-product 514 provide increased efficiency and accuracy without increasing burden or cost for the communication system 100. The initial-cancellation-product 508 and the subsequent-cancellation-product 514 can increase the efficiency and accuracy by allowing processing for the symbol-level information 111 of FIG. 1, while saving memory space and processing burden by eliminating unnecessary data and storing or using only the essential portions.

The whitening module 504 is configured to remove the residual interference and the received noise, represented by $v_i$, remaining in the initial-cancellation-product 508, the subsequent-cancellation-product 514, or a combination thereof. The whitening module 504 can remove the residual interference and the received noise by whitening the initial-cancellation-product 508, the subsequent-cancellation-product 514, or a combination thereof.

The whitening module 504 can generate an initial-whitening-product 516 based on whitening the initial-cancellation-product 508, generate a subsequent-whitening-product 518 based on whitening the subsequent-cancellation-product 514, or a combination thereof. The initial-whitening-product 516, the subsequent-whitening-product 518, or a combination thereof can be expressed as:

$$\check{y}_i = R_{I,i}^{-\frac{1}{2}} \check{y}_i = \check{H}_D x_D + \check{n}_i.$$

Equation (14)

The whitening module 504 can whiten the initial-cancellation-product 508, the subsequent-cancellation-product 514, or a combination thereof based on:

$$R_{I,i} = H_{I,i} Q_{I,i} H_{I,i}^+ + I_{N_r}.$$

Equation (15).

The term $R_{I,i}$ can represent a covariance matrix of the residual interference with the received noise, represented by $v_i$. A diagonal matrix $Q_{I,i}$ can be the soft covariance matrix for the residual interference, expressed as $E[(x_{I,i}-\bar{x}_{I,i})(x_{I,i}-\bar{x}_{I,i})^*]$. The nth diagonal element of $Q_{I,i}$ can be expressed as:

$$Q_{I,i}(n,n) = E[|x_{I,i}(n)|^2 | L^{(A,2,I)}] - |\bar{x}_{I,i}(n)|^2.$$

Equation (16).

The second order expectation of $|x_{I,i}(n)|$ can be calculated using:

$$E[|x_{I,i}(n)|^2 | L^{(A,2,I)}] = \sum_{s_k \in e} |s_k|^2 \prod_{m=1}^{M} \frac{1}{2}\left(1 + b_{m,n}^I \tanh\left(\frac{L_{m,n,i}^{(A,2,I)}}{2}\right)\right).$$

Equation (17)

The whitening module 504 can whiten using the decoder interference-a-posteriori value 344 as shown in Equation (17), similar to Equation (13).

The whitening module 504 can use the first communication unit 216, the second communication unit 236, the first control unit 212, the second control unit 234, or a combination thereof to generate the initial-whitening-product 516, the subsequent-whitening-product 518, or a combination thereof. The whitening module 504 can store the initial-whitening-product 516, the subsequent-whitening-product 518, or a combination thereof in the first storage unit 214, the second storage unit 246, or a combination thereof.

It has been discovered that the initial-whitening-product 516 and the subsequent-whitening-product 518 increase accuracy in processing the receiver signal 118, the repeat response 134, or a combination thereof. The whitening module 504 performing the whitening process to generate initial-whitening-product 516 and the subsequent-whitening-product 518 can eliminate the residual interference with the received noise left over after the cancelling processes of the interference cancellation module 502.

The cancellation combination module 506 is configured to combine the repeat response 134 and the receiver signal 118. The cancellation combination module 506 can combine the repeat response 134 and the receiver signal 118 according to the interference-aware processing mechanism 334 for the symbol-level information 111.

The cancellation combination module 506 can combine the repeat response 134 and the receiver signal 118 using the initial-whitening-product 516, the subsequent-whitening-product 518, or a combination thereof derived from the initial-cancellation-product 508, the subsequent-cancellation-product 514 or a combination thereof with the first communication unit 216, the second communication unit 236, the first control unit 212, the second control unit 234, or a combination thereof. For example, the cancellation combination module 506 can combine the repeat response 134 and the receiver signal 118 by combining a stored instance of the initial-whitening-product 516 with the subsequent-cancellation-product 514.

The repeat response 134 or the repeat data 138 associated with the serving data 124 therein corresponding to the $i^{th}$ transmission, represented as $\tilde{y}_i$, and the serving channel estimate 126 of FIG. 1, represented as $\tilde{H}_{D,i}$, can be added to the stored instances of the corresponding results for the receiver signal 118. As multiplying the Hermitian of the $\tilde{H}_{D,i}$, both signals can be updated with the maximal-ratio combining (MRC) scheme.

Before receiving another transmission, the cancellation combination module 506 can store the combined result as the initial-whitening-product 516, the initial-cancellation-product 508, or a combination thereof. The interference cancellation module 502 can repeat the process for the repeat response 134 or a newly-received instance thereof to calculate the subsequent-whitening-product 518, the subsequent-cancellation-product 514, or a combination thereof.

The cancellation combination module 506 combine the results from the repeat response 134 or a newly-received instance thereof with the stored combine result in the initial-whitening-product 516, the initial-cancellation-product 508, or a combination thereof. The combined result can be decoded with the decoding module 308 according to the interference-aware processing mechanism 334.

The combining process for the cancellation combination module 506 can be represented as:

$$\check{y}_{i+1} = \begin{bmatrix} \hat{H}_i^{-\frac{1}{2}} \hat{y}_i \\ y_{i+1} \end{bmatrix} = \check{H}_{D,i+1} x_D + \check{H}_{I,i+1} x_{I,i+1} + \check{n}_{i+1}.$$ Equation (18)

The term $\hat{y}_{i}$ can represent the instance of the initial-whitening-product 516, the initial-cancellation-product 508, or a combination thereof having been stored, combined, or a combination of processes thereof. The term $\hat{y}_i$ can represent a colored signal with the covariance of $\hat{H}_i$ having been pre-whitened and combined with $y_{i+1}$.

The communication system 100 has been described with module functions or order as an example. The communication system 100 can partition the modules differently or order the modules differently.

For example, functions of the serving analysis module 314 of FIG. 3 and the interference analysis module 316 can be combined. Also for example, the overlap module 350 of FIG. 3 can be separated from the combining module 304 of FIG. 3 and performed before the bit-level module 354 of FIG. 3, the symbol-level module 356 of FIG. 3, or a combination thereof. Similarly, the interleaving and de-interleaving functions of the combining module 304 can be separated into one or more modules and performed before, after, or a combination thereof relative to the detector module 302, the decoding module 306 of FIG. 3, or a combination thereof.

It has also been discovered that the initial-whitening-product 516 and the subsequent-whitening-product 518 increase efficiency for the communication system 100. The initial-whitening-product 516 and the subsequent-whitening-product 518 allow for the communication system 100 to fully utilize repeated data and combine the signals at the symbol-level information 111.

The modules described in this application can be hardware implementation or hardware accelerators, including passive circuitry, active circuitry, or both, in the first control unit 216 or in the second control unit 238. The modules can also be hardware implementation or hardware accelerators, including passive circuitry, active circuitry, or both, within the first device 102 of FIG. 1 or the second device 106 of FIG. 1 but outside of the first control unit 216 or the second control unit 238, respectively.

The physical transformation from the receiver signal 118 and the repeat request 132 through changes in the initial extrinsic value 330 of FIG. 3, the subsequent extrinsic value 332 of FIG. 3, the initial-interference-channel 402, the initial-interference-data 406, the subsequent-interference-channel 404, the subsequent-interference-data 408, the initial-interference soft-estimate 510, the initial-cancellation-product 508, the initial-whitening-product 516, the subsequent-interference soft-estimate 512, the subsequent-cancellation-product 514, the subsequent-whitening-product 518, or a combination thereof results in the movement in the physical world, such as content displayed or recreated for the user on the mobile device 102. The content, such as navigation information or voice signal of a caller, recreated on the first device 102 can influence the user's movement, such as following the navigation information or replying back to the caller. Movement in the physical world results in changes to the transmitter channel 110 of FIG. 1, the interference channel 116 of FIG. 1, and the interference signal 114 of FIG. 1, which can be fed back into the communication system 100 to process the receiver signal 118 and the repeat request 132.

Figure 6:
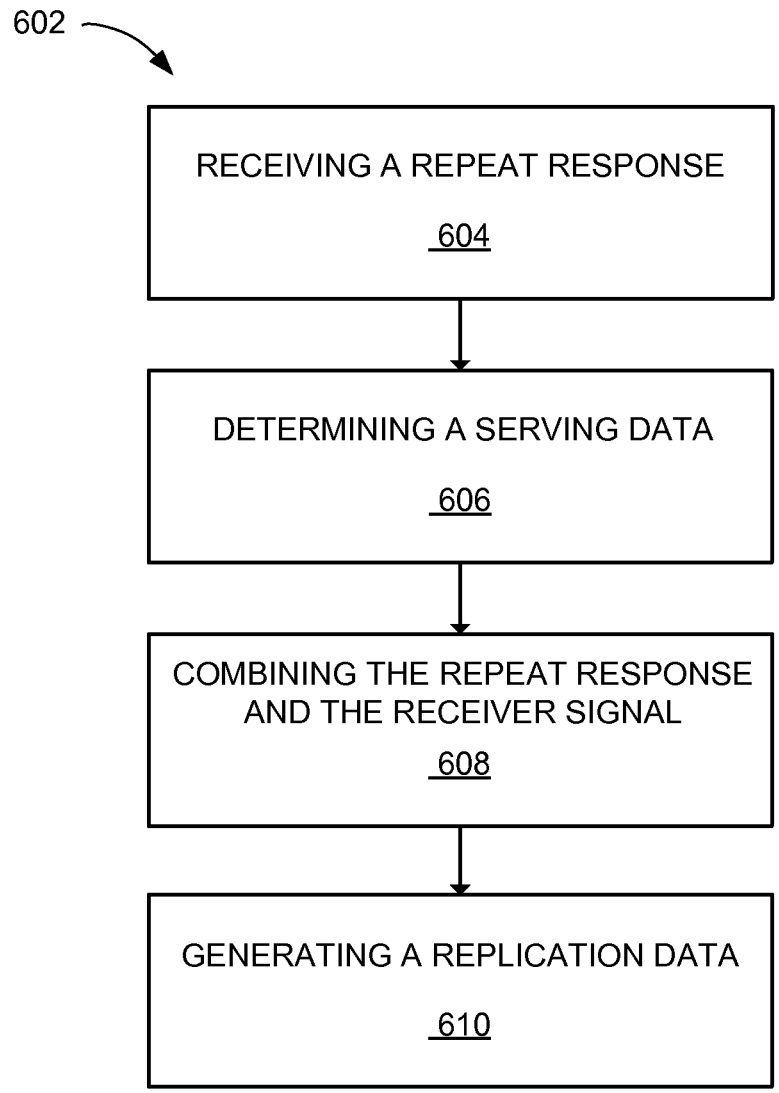
FIG. 6 is a flow chart of a method of operation of a communication system in an embodiment of the present invention.

Referring now to FIG. 6, therein is shown a flow chart of a method 602 of operation of a communication system 100 in an embodiment of the present invention. The method 602 includes: receiving a repeat response for receiving the repeat response associated with a receiver signal in a block 604; determining a serving data, a serving channel estimate, an interference channel estimate, or a combination thereof an interference data from the repeat response with an interference-aware processing mechanism in a block 606; combining the repeat response and the receiver signal based on the serving data, the serving channel estimate, the interference channel estimate, the interference data, or a combination thereof in a block 608; and generating a replication data based on combining the repeat response and the receiver signal based on the serving data, the serving channel estimate, the interference channel estimate, the interference data, or a combination thereof for communicating with a device in a block 610.

It has been discovered that the concatenation signal set 412 of FIG. 4 including the serving data 124 of FIG. 1, the serving channel estimate 126 of FIG. 1, the interference data 128 of FIG. 1, and the interference channel estimate 130 of FIG. 1, the initial-whitening-product 516 of FIG. 5, and the subsequent-whitening-product 518 of FIG. 5 increase efficiency by allowing for signals to be combined at the symbol-level information 111 of FIG. 1. Further, it has been discovered that the concatenation signal set 412 including the serving data 124, the serving channel estimate 126, the interference data 128, and the interference channel estimate 130, the initial-whitening-product 516, and the subsequent-whitening-product 518 for all relevant transmissions processed with the interference-aware processing mechanism 334 of FIG. 3 provides accurate and speedy reproduction of the replication data 348 of FIG. 3.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
a signal identification module configured to receive a repeat response associated with a receiver signal;
a signal analysis module, coupled to the signal identification module, configured to determine a serving data, a serving channel estimate, an interference data, an interference channel estimate, or a combination thereof from the repeat response with an interference-aware processing mechanism;
a combining module, coupled to the signal analysis module, configured to combine the repeat response and the receiver signal based on the serving data, the serving channel estimate, the interference channel estimate, the interference data, or a combination thereof; and
a decoding module, coupled to the combining module, configured to generate a replication data based on combining the repeat response and the receiver signal based on the serving data, the serving channel estimate, the interference channel estimate, the interference data, or a combination thereof for communicating with a device.

2. The system as claimed in claim 1 wherein:
the signal identification module is configured to receive the receiver signal preceding the repeat response;
the signal analysis module includes an interference analysis module configured to determine an initial-interference-channel associated with the receiver signal; and
the combining module includes a stacking module configured to combine the repeat response and the receiver signal using the initial-interference-channel.

3. The system as claimed in claim 1 wherein:
the signal identification module is configured to receive the receiver signal preceding the repeat response;
the decoding module is configured to determine an initial-interference-data associated with the receiver signal; and
the combining module includes a stacking module configured to combine the repeat response and the receiver signal based on the initial-interference-data.

4. The system as claimed in claim 1 wherein:
the signal identification module is configured to receive the receiver signal preceding the repeat response;
the decoding module is configured to determine an initial-interference-data for the receiver signal;
the combining module includes:
an interference cancellation module configured to calculate an initial-cancellation-product from the receiver signal based on the initial-interference-data,
a cancellation combination module configured to combine the repeat response and the receiver signal based on the initial-cancellation-product.

5. The system as claimed in claim 1 wherein:
the signal identification module is configured to receive the receiver signal preceding the repeat response;
the signal analysis module includes a serving analysis module configured to calculate an initial extrinsic value based on the receiver signal; and
the combining module includes a bit-level module configured to combine the repeat response and the receiver signal using the initial extrinsic value for a bit-level information.

6. The system as claimed in claim 1 wherein:
the signal identification module is configured to receive the receiver signal preceding the repeat response;
the signal analysis module includes an interference analysis module configured to determine an initial-interference-channel from the receiver signal; and
the decoding module is configured to decode the receiver signal, the repeat response, a portion therein, or a combination thereof by determining an initial-interference-data using the interference-aware processing mechanism.

7. The system as claimed in claim 6 wherein:
the interference analysis module is configured to determine a subsequent-interference-channel associated with the repeat response;
the decoding module is configured to determine a subsequent-interference-data associated with the repeat response; and
the combining module includes a stacking module configured to combine the repeat response and the receiver signal using a combination of the initial-interference-channel, the subsequent-interference-channel, the initial-interference data, and the subsequent-interference-data for a symbol-level information.

8. The system as claimed in claim 6 wherein:
the decoding module is configured to determine a subsequent-interference-data for the repeat response; and
the combining module includes an interference cancellation module configured to:
calculate an initial-cancellation-product from the receiver signal based on an initial-interference soft-estimate associated with the initial-interference-data,
calculate a subsequent-cancellation-product from the repeat response based on a subsequent-interference soft-estimate associated with the subsequent-interference-data;
the combining module includes a cancellation combination module configured to combine the receiver signal, the repeat response, or a combination thereof using the initial-cancellation-product and the subsequent-cancellation-product according to the interference-aware processing mechanism for a symbol-level information.

9. The system as claimed in claim 6 wherein:
the interference analysis module is configured to determine a subsequent-interference-channel for the repeat response;
the decoding module is configured to determine a subsequent-interference-data for the repeat response; and
the combining module includes a whitening module configured to:
generate an initial-whitening-product based on whitening an initial-cancellation-product associated with the receiver signal, the initial-interference-data, and the initial-interference-channel,
generate a subsequent-whitening-product based on whitening a subsequent-cancellation-product associated with the repeat response, the subsequent-interference-data, and the subsequent-interference-channel;
the combining module includes a cancellation combination module configured to combine the receiver signal, the repeat response, or a combination thereof using the initial-whitening-product and the subsequent-whitening-product according to the interference-aware processing mechanism for a symbol-level information.

10. The system as claimed in claim 6 further comprising:
an overlap module, coupled to the signal analysis module, configured to identify an overlap region between the receiver signal and the repeat response; and
a control module, coupled to the overlap module, configured to combine the repeat response and the receiver signal for a symbol-level information in the overlap region.

11. A method of operation of a communication system comprising:
receiving a repeat response for receiving the repeat response associated with a receiver signal;
determining a serving data, a serving channel estimate, an interference data, an interference channel estimate, or a combination thereof from the repeat response with an interference-aware processing mechanism;
combining the repeat response and the receiver signal based on the serving data, the serving channel estimate, the interference channel estimate, the interference data, or a combination thereof; and
generating a replication data based on combining the repeat response and the receiver signal based on the serving data, the serving channel estimate, the interference channel estimate, the interference data, or a combination thereof with a control unit for communicating with a device.

12. The method as claimed in claim 11 further comprising:
receiving the receiver signal preceding the repeat response;
determining an initial-interference-channel for representing the interference channel estimate associated with the receiver signal; and
wherein combining the repeat response and the receiver signal includes:
combining the repeat response and the receiver signal using the initial-interference-channel.

13. The method as claimed in claim 11 further comprising:
receiving the receiver signal preceding the repeat response;
determining an initial-interference-data associated with the receiver signal; and
wherein combining the repeat response and the receiver signal includes:
combining the repeat response and the receiver signal based on the initial-interference-data.

14. The method as claimed in claim 11 wherein:
receiving the receiver signal preceding the repeat response;
determining an initial-interference-data for the receiver signal;
calculating an initial-cancellation-product from the receiver signal based on the initial-interference-data;
wherein combining the repeat response and the receiver signal includes:
combining the repeat response and the receiver signal based on the initial-cancellation-product.

15. The method as claimed in claim 11 further comprising:
receiving the receiver signal preceding the repeat response;
calculating an initial extrinsic value based on the receiver signal;
wherein combining the repeat response and the receiver signal includes:
combining the repeat response and the receiver signal using the initial extrinsic value for a bit-level information.

16. The method as claimed in claim 11 further comprising:
receiving the receiver signal preceding the repeat response;
determining an initial-interference-channel and an initial-interference-data from the receiver signal using the interference-aware processing mechanism; and
wherein generating the replication data includes:
decoding the receiver signal, the repeat response, a portion therein, or a combination thereof with the initial-interference-data and the initial-interference-channel using the interference-aware processing mechanism.

17. The method as claimed in claim 16 wherein combining the repeat response and the receiver signal includes:
determining a subsequent-interference-data and a subsequent-interference-channel associated with the repeat response;
combining the repeat response and the receiver signal using a combination of the initial-interference-channel, the subsequent-interference-channel, the initial-interference data, and the subsequent-interference-data for a symbol-level information.

18. The method as claimed in claim 16 further comprising:
calculating an initial-cancellation-product from the receiver signal based on an initial-interference soft-estimate associated with the initial-interference-data;
wherein generating the replication data includes:
determining a subsequent-interference-data for the repeat response;
calculating a subsequent-cancellation-product from the repeat response based on a subsequent-interference soft-estimate associated with the subsequent-interference-data; and
decoding the receiver signal, the repeat response, or a combination thereof using the initial-cancellation-product and the subsequent-cancellation-product according to the interference-aware processing mechanism for a symbol-level information.

19. The method as claimed in claim 16 further comprising:
generating an initial-whitening-product based on whitening an initial-cancellation-product associated with the receiver signal, the initial-interference-data, and the initial-interference-channel;
wherein generating the replication data includes:
determining a subsequent-interference-data and a subsequent-interference-channel for the repeat response;
generating a subsequent-whitening-product based on whitening a subsequent-cancellation-product associated with the repeat response, the subsequent-interference-data, and the subsequent-interference-channel; and
decoding the receiver signal, the repeat response, or a combination thereof using the initial-whitening-product and the subsequent-whitening-product according to the interference-aware processing mechanism for a symbol-level information.

20. The method as claimed in claim 16 further comprising:
identifying an overlap region between the receiver signal and the repeat response; and wherein combining the repeat response and the receiver signal includes:
combining the repeat response and the receiver signal for a symbol-level information in the overlap region.

* * * * *